(12) United States Patent
Muramatti et al.

(10) Patent No.: US 11,481,269 B2
(45) Date of Patent: Oct. 25, 2022

(54) RECOMMENDATION ENGINE BASED ON CLASSIFICATION OF VIRTUALIZED WORKLOAD

(71) Applicant: Nutanix, Inc., San Jose, CA (US)

(72) Inventors: Akshay Narayan Muramatti, Santa Clara, CA (US); Venkata Vamsi Krishna Kothuri, San Jose, CA (US); Isha Singhal, Milpitas, CA (US); Matthew James Armstrong, Gilroy, CA (US)

(73) Assignee: Nutanix, Inc., San Jose, CA (US)

( * ) Notice: Subject to any disclaimer, the term of this patent is extended or adjusted under 35 U.S.C. 154(b) by 128 days.

(21) Appl. No.: 17/127,806

(22) Filed: Dec. 18, 2020

(65) Prior Publication Data

US 2022/0138040 A1 May 5, 2022

Related U.S. Application Data

(60) Provisional application No. 63/121,185, filed on Dec. 3, 2020, provisional application No. 63/107,983, filed on Oct. 30, 2020.

(51) Int. Cl.
*G06F 11/07* (2006.01)
*H04L 41/0813* (2022.01)
(Continued)

(52) U.S. Cl.
CPC ............ *G06F 11/0793* (2013.01); *G06F 8/65* (2013.01); *G06F 11/004* (2013.01);
(Continued)

(58) Field of Classification Search
CPC ............ H04L 41/0813; H04L 41/0654; H04L 41/0816; H04L 41/082; H04L 41/0863;
(Continued)

(56) References Cited

U.S. PATENT DOCUMENTS 7,555,046 B2 6/2009 Zoghlami et al.
8,549,518 B1 10/2013 Aron et al.
(Continued)

FOREIGN PATENT DOCUMENTS

CN 114026834 2/2022
EP 3 128 475 2/2017
(Continued)

OTHER PUBLICATIONS

"Build Intelligence on the Router Using AI-Driven Telemetry," https://www.cisco.com/c/en/us/td/docs/iosxr/ncs5500/telemetry/73x/b-telemetry-cg-ncs5500-73x/AI-driven-telemetry.html, pp. 1-12.
(Continued)

*Primary Examiner* — Bryce P Bonzo
*Assistant Examiner* — Michael Xu
(74) *Attorney, Agent, or Firm* — Foley & Lardner LLP

(57) ABSTRACT

Various embodiments disclosed herein are related to a non-transitory computer readable storage medium. In some embodiments, the medium includes instructions stored thereon that, when executed by a processor, cause the processor to classify, on a cloud server, a plurality of clusters of an edge network based on one or more classification parameters, detect that a first cluster in a first datacenter of the edge network has an issue, determine a classification parameter value of the first cluster, determine that a second cluster in a second datacenter of the edge network has a second classification parameter value within a predetermined amount of the classification parameter value, and send an instruction to the second cluster to perform a remediation action.

26 Claims, 13 Drawing Sheets

(51) Int. Cl.

| | |
|---|---|
| *H04L 67/00* | (2022.01) |
| *H04L 67/10* | (2022.01) |
| *H04L 41/0866* | (2022.01) |
| *H04L 41/0816* | (2022.01) |
| *H04L 41/0859* | (2022.01) |
| *H04L 41/08* | (2022.01) |
| *H04L 41/0893* | (2022.01) |
| *H04L 41/0654* | (2022.01) |
| *H04L 41/082* | (2022.01) |
| *G06F 8/65* | (2018.01) |
| *H04L 43/50* | (2022.01) |
| *G06F 11/14* | (2006.01) |
| *G06F 11/00* | (2006.01) |

(52) U.S. Cl.
CPC ........ *G06F 11/008* (2013.01); *G06F 11/0709* (2013.01); *G06F 11/142* (2013.01); *H04L 41/0654* (2013.01); *H04L 41/082* (2013.01); *H04L 41/0813* (2013.01); *H04L 41/0816* (2013.01); *H04L 41/0863* (2013.01); *H04L 41/0866* (2013.01); *H04L 41/0886* (2013.01); *H04L 41/0893* (2013.01); *H04L 43/50* (2013.01); *H04L 67/10* (2013.01); *H04L 67/34* (2013.01)

(58) Field of Classification Search
CPC ............. H04L 41/0866; H04L 41/0886; H04L 41/0893; H04L 43/50; H04L 67/10; H04L 67/34; H04L 41/0894; H04L 41/0895; H04L 41/40; H04L 41/5058; H04L 67/1097; G06F 8/65; G06F 11/004; G06F 11/008; G06F 11/0709; G06F 11/0793; G06F 11/142
See application file for complete search history.

(56) References Cited

U.S. PATENT DOCUMENTS

| | | | |
|---|---|---|---|
| 8,561,175 B2 | 10/2013 | Williams et al. | |
| 8,601,473 B1 | 12/2013 | Aron et al. | |
| 8,682,918 B2 | 3/2014 | Ramanujam | |
| 8,745,214 B2 | 6/2014 | Inamdar et al. | |
| 8,850,130 B1 | 9/2014 | Aron et al. | |
| 8,863,124 B1 | 10/2014 | Aron | |
| 8,875,129 B2 | 10/2014 | Wagner et al. | |
| 8,909,766 B1 | 12/2014 | Hegg et al. | |
| 9,009,106 B1 | 4/2015 | Aron et al. | |
| 9,069,708 B2 | 6/2015 | Gill et al. | |
| 9,218,176 B1 | 12/2015 | Alberti et al. | |
| 9,305,008 B2 | 4/2016 | Mensch et al. | |
| 9,323,579 B2 | 4/2016 | Parikh | |
| 9,336,132 B1 | 5/2016 | Aron et al. | |
| 9,413,616 B2 | 8/2016 | Nguyen et al. | |
| 9,419,856 B1 | 8/2016 | Chawla et al. | |
| 9,459,926 B2 | 10/2016 | Shakirzyanov et al. | |
| 9,633,037 B2 | 4/2017 | Smith et al. | |
| 9,652,265 B1 | 5/2017 | Narayanasamy et al. | |
| 9,652,485 B1 | 5/2017 | Bhargava et al. | |
| 9,747,287 B1 | 8/2017 | Bhardwaj et al. | |
| 9,772,866 B1 | 9/2017 | Aron et al. | |
| 9,799,082 B1 | 10/2017 | Raskin et al. | |
| 9,817,651 B2 | 11/2017 | Viswanathan et al. | |
| 10,007,513 B2 | 6/2018 | Malladi et al. | |
| 10,007,710 B2 | 6/2018 | Chen et al. | |
| 10,027,728 B2 | 7/2018 | Yang et al. | |
| 10,061,464 B2 | 8/2018 | Addala et al. | |
| 10,114,882 B2 | 10/2018 | Lipstone | |
| 10,158,534 B2 | 12/2018 | Acharya et al. | |
| 10,178,021 B1 | 1/2019 | Devillard et al. | |
| 10,313,474 B1 | 6/2019 | Farrugia et al. | |
| 10,432,699 B2 | 10/2019 | Griffith et al. | |
| 10,503,427 B2 | 12/2019 | Botes et al. | |
| 10,585,908 B2 | 3/2020 | Russell | |
| 10,713,079 B2 | 7/2020 | Muramatti et al. | |
| 10,785,122 B2 | 9/2020 | Inamdar et al. | |
| 10,791,421 B1 | 9/2020 | Rothschild et al. | |
| 11,061,729 B2 | 7/2021 | Singh et al. | |
| 11,082,525 B2 | 8/2021 | Sethuraman et al. | |
| 2005/0055575 A1 | 3/2005 | Evans et al. | |
| 2008/0126773 A1 | 5/2008 | Martinez et al. | |
| 2010/0162374 A1 | 6/2010 | Nair | |
| 2011/0007748 A1 | 1/2011 | Yin et al. | |
| 2011/0280134 A1 | 11/2011 | Zheng | |
| 2012/0089410 A1 | 4/2012 | Mikurak | |
| 2012/0271926 A1 | 10/2012 | Shakirzyanov et al. | |
| 2013/0103834 A1 | 4/2013 | Dzerve et al. | |
| 2014/0317273 A1 | 10/2014 | Kruglick | |
| 2014/0372376 A1 | 12/2014 | Smith et al. | |
| 2015/0180714 A1 | 6/2015 | Chunn et al. | |
| 2015/0193220 A1 | 7/2015 | Rork et al. | |
| 2015/0220331 A1 | 8/2015 | Bernstein et al. | |
| 2015/0277942 A1 | 10/2015 | Rork et al. | |
| 2015/0281285 A1 | 10/2015 | Bharali et al. | |
| 2015/0281374 A1 | 10/2015 | Petersen et al. | |
| 2015/0286475 A1 | 10/2015 | Vangelov et al. | |
| 2015/0288636 A1 | 10/2015 | Yalavarty et al. | |
| 2016/0085772 A1 | 3/2016 | Vermeulen et al. | |
| 2016/0105370 A1 | 4/2016 | Mellor et al. | |
| 2016/0205189 A1* | 7/2016 | Mopur | G06F 15/16 709/213 |
| 2016/0253710 A1 | 9/2016 | Publicover et al. | |
| 2016/0292166 A1 | 10/2016 | Russell | |
| 2017/0085447 A1 | 3/2017 | Chen et al. | |
| 2017/0318113 A1 | 11/2017 | Ganichev et al. | |
| 2017/0373930 A1 | 12/2017 | Danilov et al. | |
| 2018/0131770 A1 | 5/2018 | Doraiswamy et al. | |
| 2018/0136862 A1 | 5/2018 | Rusenas et al. | |
| 2018/0176073 A1 | 6/2018 | Dubey et al. | |
| 2018/0176663 A1 | 6/2018 | Damaggio | |
| 2018/0234337 A1 | 8/2018 | Goliya et al. | |
| 2018/0278541 A1 | 9/2018 | Wu et al. | |
| 2018/0302442 A1 | 10/2018 | Lucovsky et al. | |
| 2019/0050301 A1 | 2/2019 | Juniwal et al. | |
| 2019/0052659 A1 | 2/2019 | Weingarten et al. | |
| 2019/0058626 A1 | 2/2019 | Knowles et al. | |
| 2019/0058643 A1 | 2/2019 | Knowles et al. | |
| 2019/0065292 A1 | 2/2019 | Yu et al. | |
| 2019/0065508 A1 | 2/2019 | Guturi et al. | |
| 2019/0073378 A1 | 3/2019 | Guturi et al. | |
| 2019/0123928 A1 | 4/2019 | Aston | |
| 2019/0213089 A1 | 7/2019 | Podge et al. | |
| 2019/0220361 A1* | 7/2019 | Mageswaran | G06F 11/302 |
| 2019/0281132 A1* | 9/2019 | Sethuraman | H04L 9/0825 |
| 2019/0303900 A1 | 10/2019 | Golberg | |
| 2019/0340168 A1 | 11/2019 | Raman et al. | |
| 2020/0004523 A1* | 1/2020 | Eroshkina | H04L 12/66 |
| 2020/0026505 A1 | 1/2020 | Olderdissen | |
| 2020/0065317 A1 | 2/2020 | Sarkar et al. | |
| 2020/0073656 A1* | 3/2020 | Satapathy | G06F 8/71 |
| 2020/0104422 A1* | 4/2020 | Ramamoorthi | G06F 11/00 |
| 2020/0125454 A1 | 4/2020 | Naidu et al. | |
| 2020/0136920 A1 | 4/2020 | Doshi et al. | |
| 2020/0151325 A1 | 5/2020 | Chen et al. | |
| 2020/0151327 A1 | 5/2020 | Chen et al. | |
| 2020/0159560 A1 | 5/2020 | Safreno et al. | |
| 2020/0192640 A1 | 6/2020 | Lucas et al. | |
| 2020/0236168 A1 | 7/2020 | Todd | |
| 2020/0249938 A1* | 8/2020 | Shin | G06F 8/71 |
| 2020/0249979 A1 | 8/2020 | Muramatti et al. | |
| 2020/0264928 A1* | 8/2020 | Kalmuk | G06F 9/5011 |
| 2020/0351192 A1 | 11/2020 | Murao | |
| 2020/0409810 A1* | 12/2020 | Wu | G06F 9/45558 |
| 2020/0412615 A1 | 12/2020 | Baskaran et al. | |
| 2021/0004270 A1 | 1/2021 | Singh et al. | |
| 2021/0004297 A1 | 1/2021 | Scrivner et al. | |
| 2021/0014132 A1 | 1/2021 | Smith | |
| 2021/0136146 A1 | 5/2021 | Welsch et al. | |
| 2021/0203732 A1 | 7/2021 | Webb et al. | |
| 2021/0243094 A1* | 8/2021 | Holness | H04L 41/0654 |

(56) References Cited

U.S. PATENT DOCUMENTS

FOREIGN PATENT DOCUMENTS

| EP | 3 591 938 A1 | 1/2020 |
|---|---|---|
| JP | 2018-533285 A | 11/2018 |

OTHER PUBLICATIONS

Hindawi, "Management of IoT Sensor Data Using a Fog Computing Node," https://doi.org/10.1155/2019/5107457, pp. 1-10.
Slattery, Terry, "Telemetry vs. SNMP: Is one better for network management," https://www.techtarget.com/searchnetworking/answer/Telemetry-vs-SNMP-Is-one-better-for-network-management, pp. 1-4.
"Active IQ Digital Advisor: Simple, intelligent, storage health"; NetApp Active IQ—Actionable Intelligence; https://www.netapp.com/services/support/active-iq/; Accessed on Oct. 15, 2020.
AWS for the Edge; Amazon Web Services; https://aws.amazon.com/edge/?trk=ps_a134p000003ymOnAAI&trkcampaign=pac_paids; Accessed on Oct. 15, 2020.
"Cloud Insights"; Cloud Central; Cloud Insights—Monitor Optimize Your Hybrid Infrastructure; https://cloud.netapp.com/cloud-insights; Accessed on Oct. 15, 2020.
"Nutanix Insights Pulse Feature?"; HyperHCI Tech Blog; https://hyperhci.com/2019/09/13/nutanix-insights-pulse-feature/; Accessed on Oct. 21, 2020.
"What is data parsing?"; Device Management—Alibaba Cloud Documentation Center; https://www.alibabacloud.com/help/doc-detail/68702.htm; Accessed Nov. 17, 2020.
Cano, Ignacio, et al. "Curator: Self-Managing Storage for Enterprise Clusters" (Mar. 27, 2017), from https://www.usenix.org/conference/nsdi17/.
Julia White; "Enabling intelligent cloud and intelligent edge solutions for government"; Cloud Strategy; https://azure.microsoft.com/en-us/blog/enabling-intelligent-cloud-and-intelligent-edge-solutions-for-government/; Accessed on Oct. 15, 2020.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Prashant Batra; "Announcing Nutanix Insights—Predictive Health & Support Automation Service"; https://www.nutanix.com/blog/announcing-nutanix-insights-predictive-health-support-automation-service; Accessed Oct. 21, 2020.
DELLEMC White Paper, "Telemetry Streaming with iDRAC9 Server—Telemetry Performance Reports," Nov. 2020, 10 pages.
"Bringing Intelligence to the Edge," https://www.redhat.com/en/blog/bringing-intelligence-edge, pp. 1-1.
"Creating a SnapMirror policy to maximize transfer efficiency," docs.netapp.com/ocum-72/index.jsp?topic=%2Fcom.netapp.doc.onc-um-ag%2FGUID-657A296F-72A8-444D-BF77-E791BFE1E6B3.html, pp. 1-2.
"Manage data streams on the AWS IoT Greengrass Core," https://docs.aws.amazon.com/greengrass/v2/developerguide/manage-data-streams.html, pp. 1-2.
"Prioritize critical messages from your edge device to the Cloud," https://techcommunity.microsoft.com/t5/internet-of-things-blog/prioritize-critical-messages-from-your-edge-device-to-the-cloud/ba-p/1777959, pp. 1-1.
"Priority and time-to-live," https://docs.microsoft.com/en-us/azure/iot-edge/module-composition?view=iotedge-2020-11#priority-and-time-to-live, pp. 1-1.
"Reconciliation strategy|ConTig Connector Documentation|Google Cloud," https://cloud.google.com/config-connector/docs/concepts/reconciliation, pp. 1-2.
"Release Notes|NCC 4.4.0," pp. 1-10.
"What is vSAN Support Insight _ Quick Overview—Virtually Sensei," (Oct. 11, 2018), https://www.virtuallysensei.com/vsan-support-insight/, pp. 1-10.
Bryant Paul, "VMware Bringing SASE to SD-WAN VMworld 2020—Digital Thought Disruption," (Sep. 29, 2020), https://digitalthoughtdisruption.com/2020/09/29/vmware-bringing-sase-to-sd-wan-vmworld-2020/, pp. 1-10.
Fay Joe, "Waiting for Red Hat OpenShift 4.0_ Too late, 4.1 has already arrived . . . • DEVCLASS," (Jun. 5, 2019), https://devclass.com/2019/06/05/red-hat-openshift-4-1-has-already-arrived/, pp. 1-2.
Google Cloud, "Release Notes Cloud Pub/Sub Documentation," https://cloud.google.com/pubsub/docs/release-notes, pp. 1-13.
Google Cloud, "What is Pub/Sub," https://cloud.google.com/pubsub/docs/overview, pp. 1-7/.
Netapp, "Active IQ Unified Manager 9.7 is now available!," https://www.netapp.com/blog/active-iq-unified-manager-9-7/, pp. 1-9.
Netapp, "What is the difference between SnapMirror 'normal' and 'low' priority," https://kb.netapp.com/Advice_and_Troubleshooting/Data_Protection_and_Security/SnapMirror/What_is_the_difference_between_SnapMirror_, pp. 1-2.
Nutanix, "Logbay Tags Reference Guide for Nutanix Cluster Check (NCC) 4.4.0," (Dec. 15, 2021), pp. 1-288.
Nutanix, "NCC Checks Reference," (Dec. 15, 2021), pp. 1-195.
Nutanix, "Nutanix Cluster Check (NCC) 4.4.0 Guide," (Dec. 15, 2021), pp. 1-39.
Nutanix, "Nutanix Insights: Simplifying IT Support Operations," pp. 1-2.
Tham, Chen-Khong, "Active Learning for IoT Data Prioritization in Edge Nodes Over Wireless Networks," https://ieeexplore.ieee.org/document/9255294, pp. 1-6.
VMware, "Configure log forwarding from Tanzu Kubernetes Grid (TKG) to vRealize Log Insight Cloud," (Apr. 27, 2020), https://williamlam.com/2020/04/configure-log-forwarding-from-tanzu-kubernetes-grid-tkg-to-vrealize-log-insight-cloud.html, pp. 1-12.
VMware, "Mark Traffic on a Distributed Port Group or Uplink Port Group," https://docs.vmware.com/en/VMware-vSphere/7.0/com.vmware.vsphere.networking.doc/GUID-84207BEA-986E-443E-94B0-B1EC66C56598.html, pp. 1-4.
VMware,"Try Wavefront by VMware Today!—VMware Cloud Management," (Aug. 4, 2017), https://blogs.vmware.com/management/2017/08/try-wavefront-today.html, pp. 1-6.
VMware, "VMware SD-WAN Dynamic Multipath Optimization (DMPO) (2733094)," https://kb.vmware.eom/s/article/2733094, pp. 1-15.
VMware, "VMware Smart Assurance Datasheet," pp. 1-4.
VMware, "VMware Tanzu at the Edge: Solution Architecture for ROBO Topology," (Oct. 1, 2020), https://tanzu.vmware.com/content/blog/vmware-tanzu-at-the-edge-solution-architecture-for-robo-topology, pp. 1-6.
VMware, "Why is Operational Anomaly Detection So Hard?—Cloud Blog—VMware" (Apr. 21, 2016), https://blogs.vmware.com/cloud/2016/04/21/operational-anomaly-detection-hard/, pp. 1-8.
VMware, Configure Log forwarding from VMware Tanzu Kubernetes Cluster to vRealize Log Insight Cloud—VMware Cloud Management, (Jun. 11, 2020), https://blogs.vmware.com/management/2020/06/configure-log-forwarding-from-vmware-tanzu-kubernetes-cluster-to-vrealize-log-insight-cloud.html, 1-9 pages.
NetApp, "Active IQ Blog," (May 28, 2020), https://www.netapp.com/blog/data-management-active-iq/, pp. 1-9.
NetApp, "NetApp Active IQ," https://www.netapp.com/pdf.html?item=/media/9279-sb-3992.pdf, pp. 1-3.

(56) References Cited

OTHER PUBLICATIONS

NetApp, "NetApp Blog | We are the cloud storage specialists," https://www.netapp.com/blog/#q=RipWilson&t=Blogs&sort=relevancy&layout=card&f:@facet_language_mktg=[English], pp. 1-8.

* cited by examiner

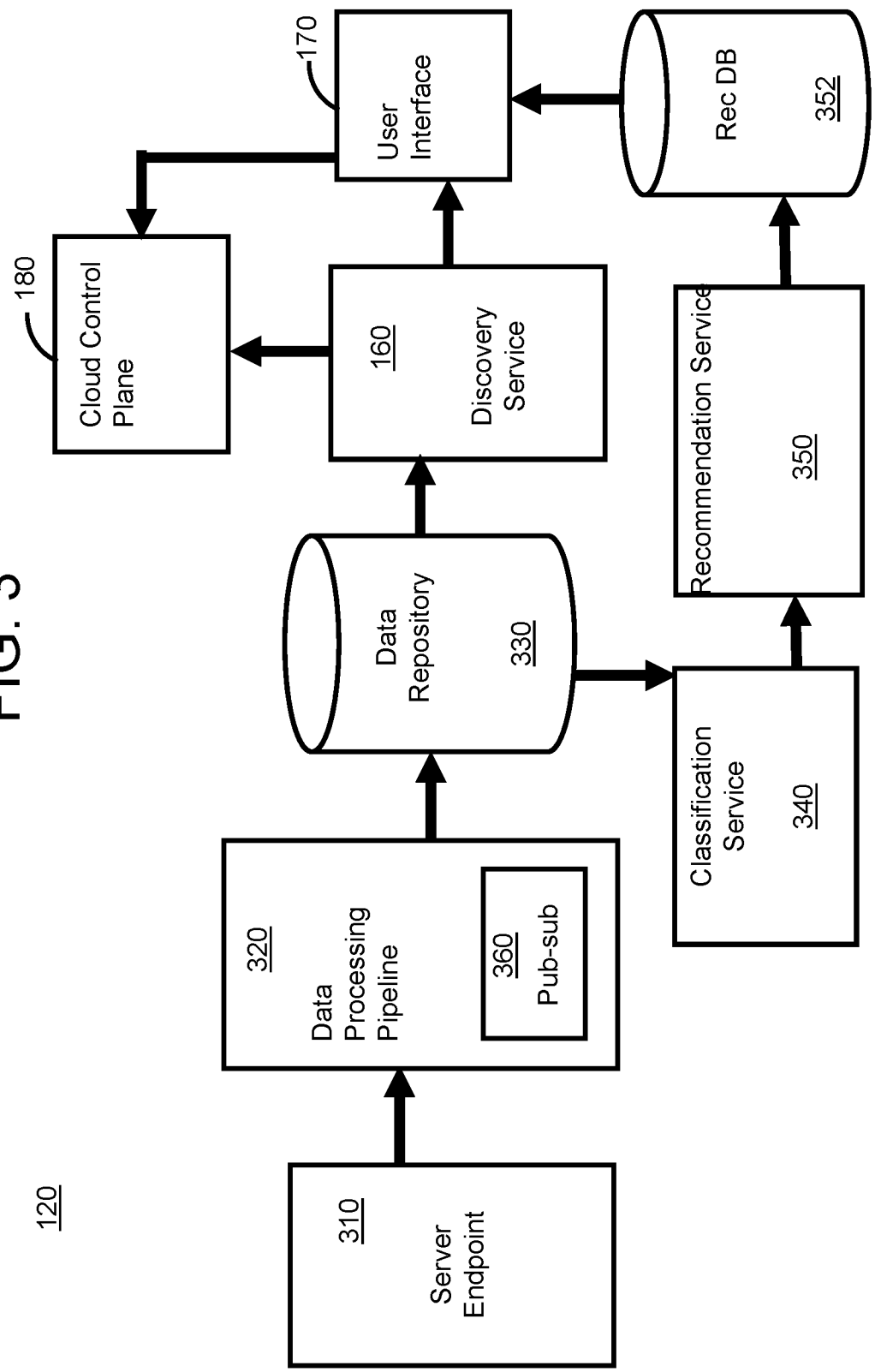

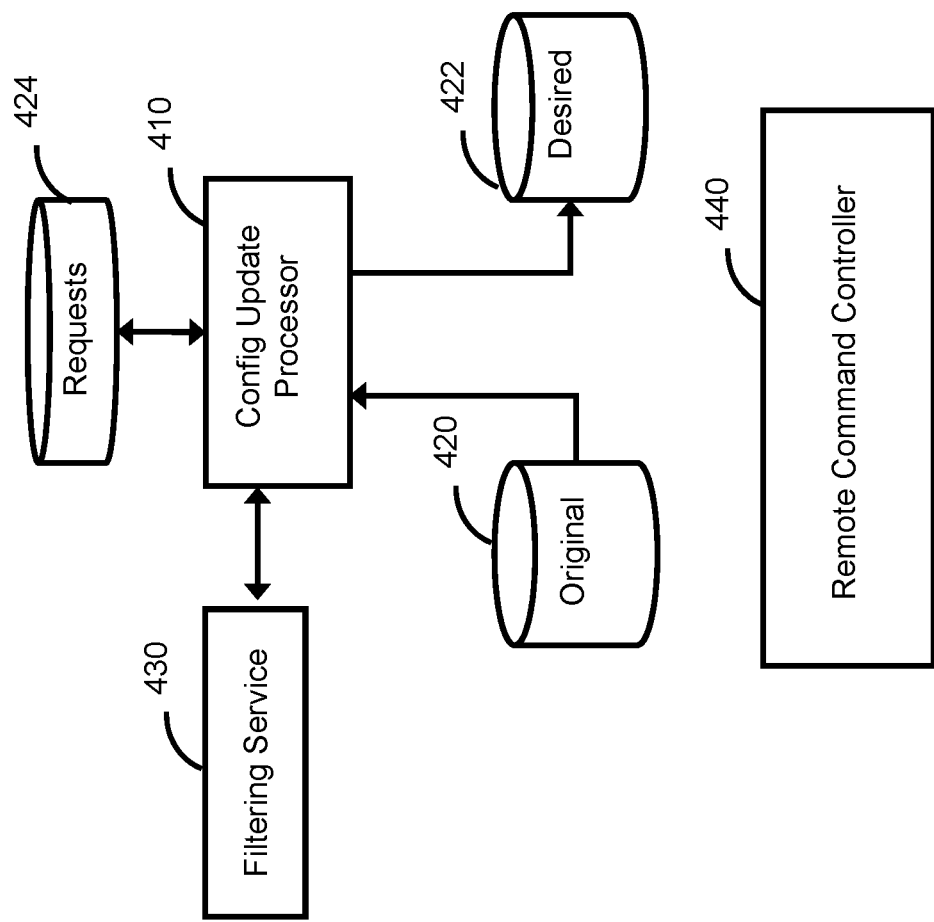

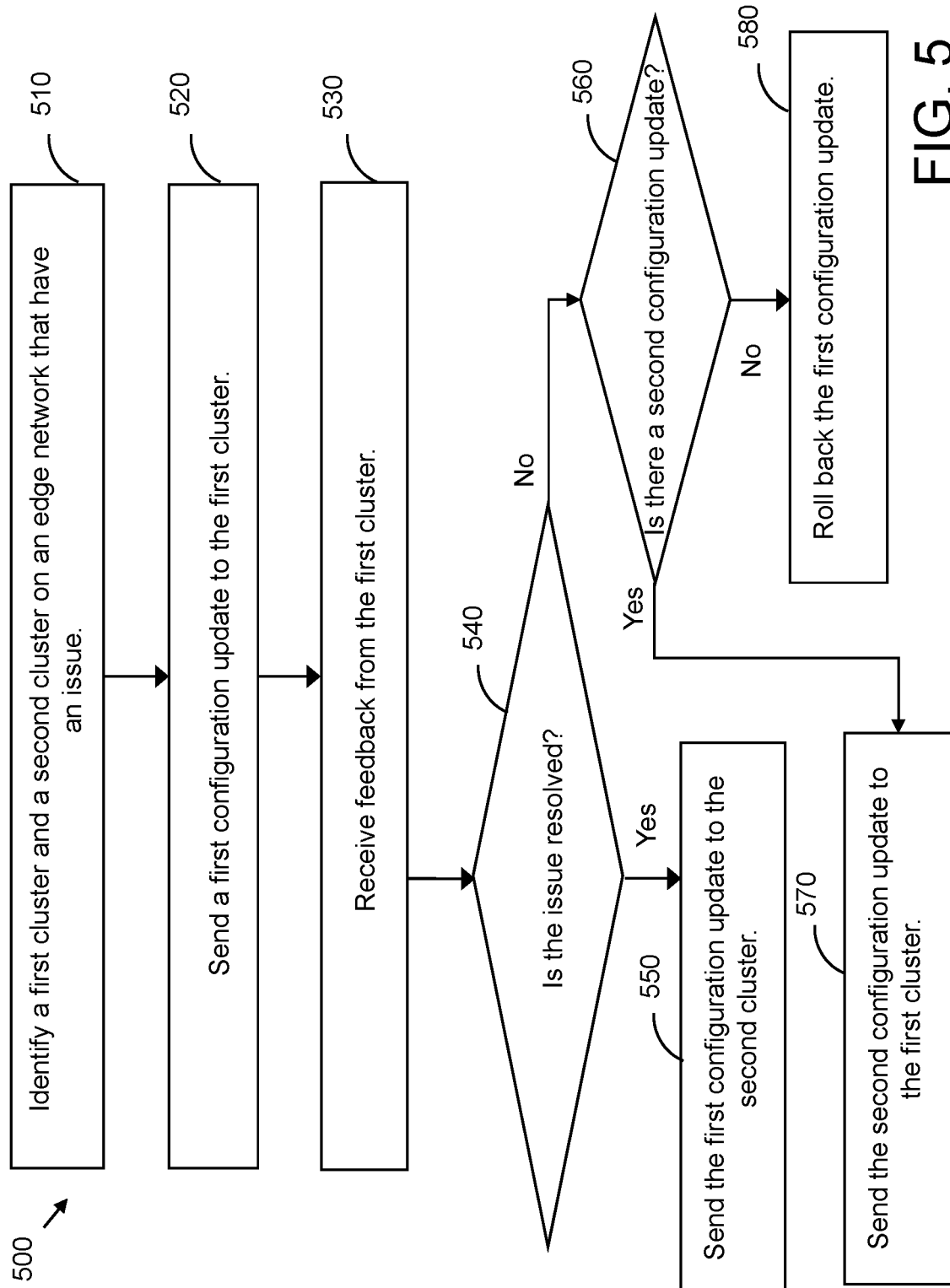

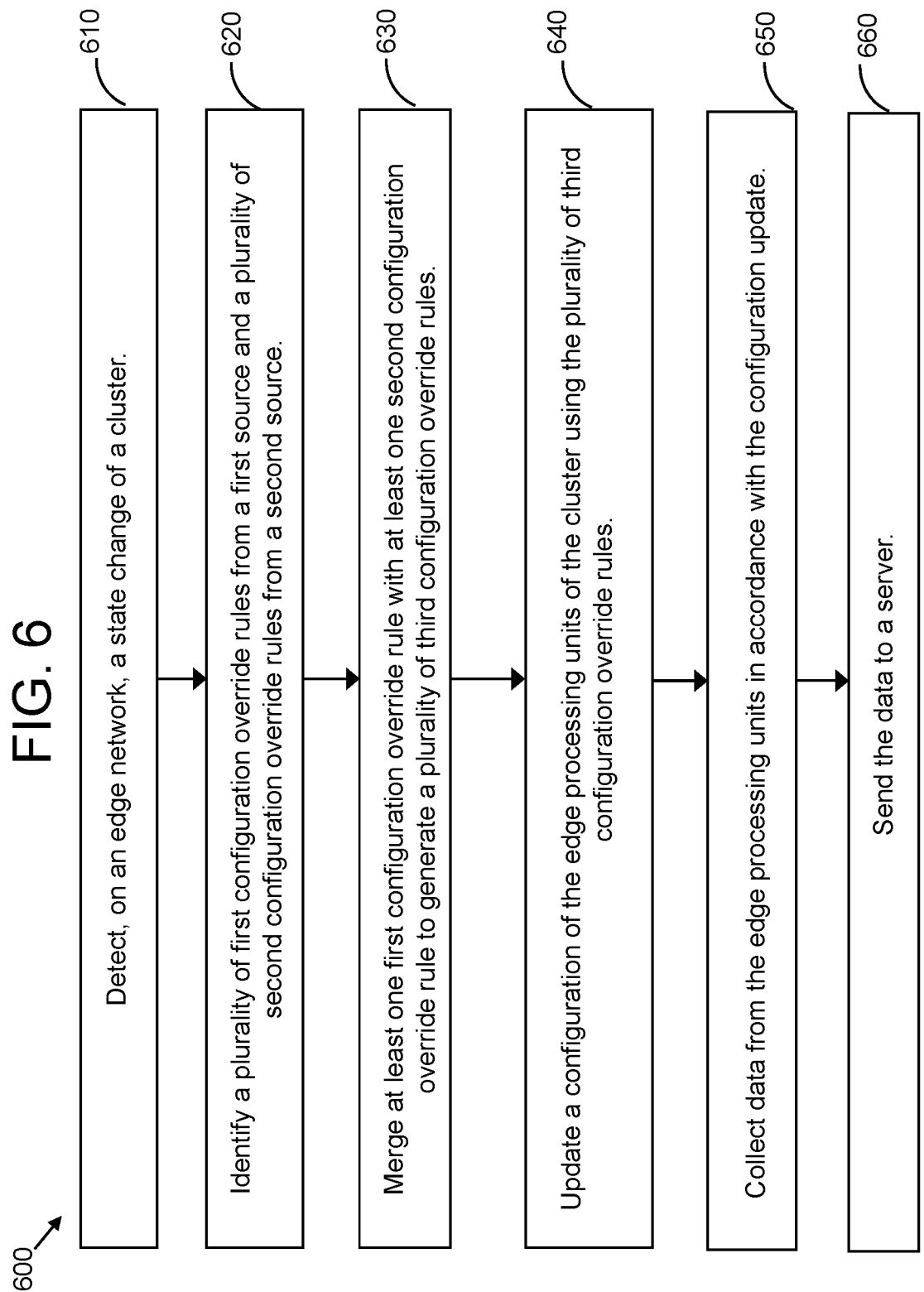

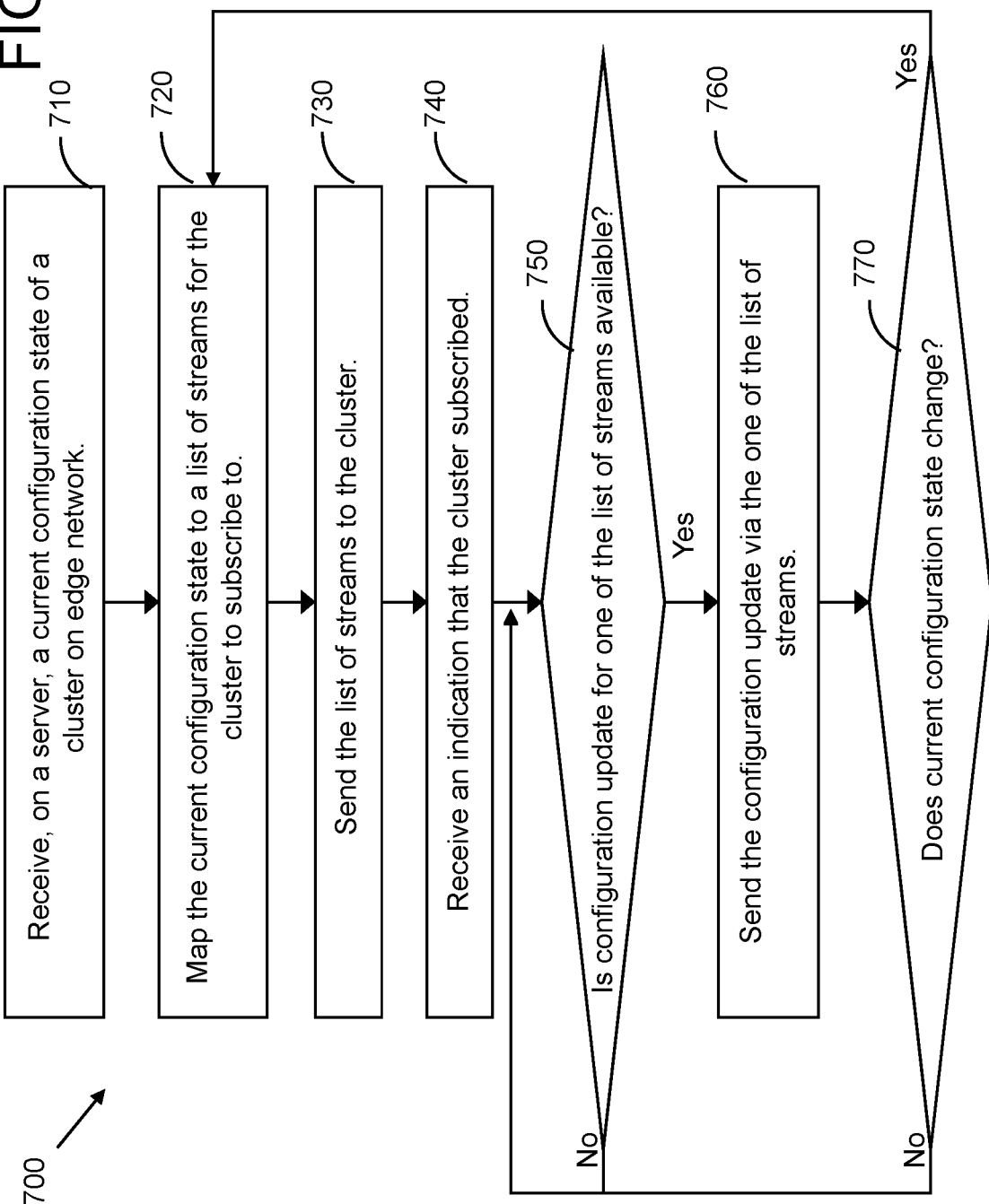

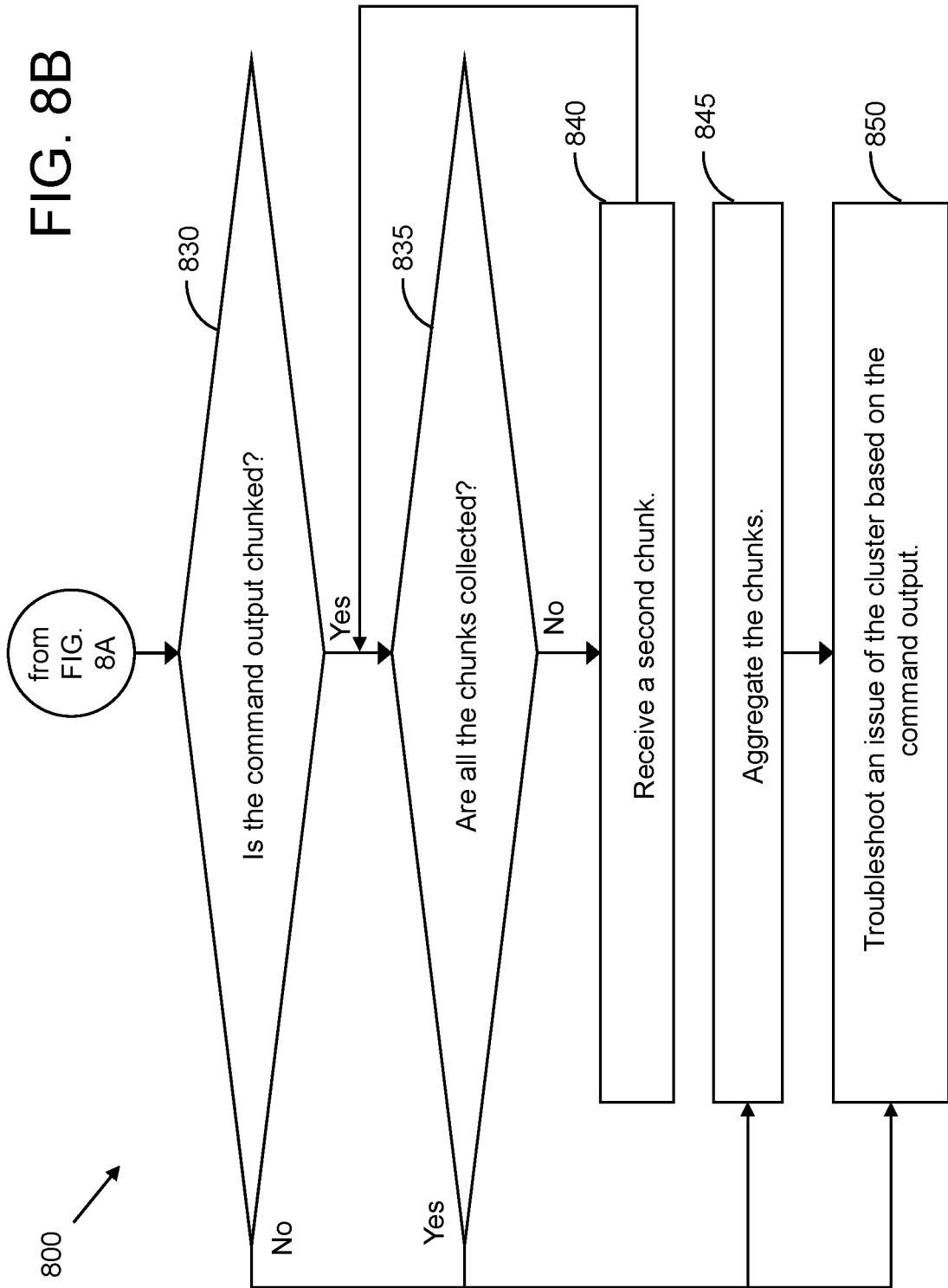

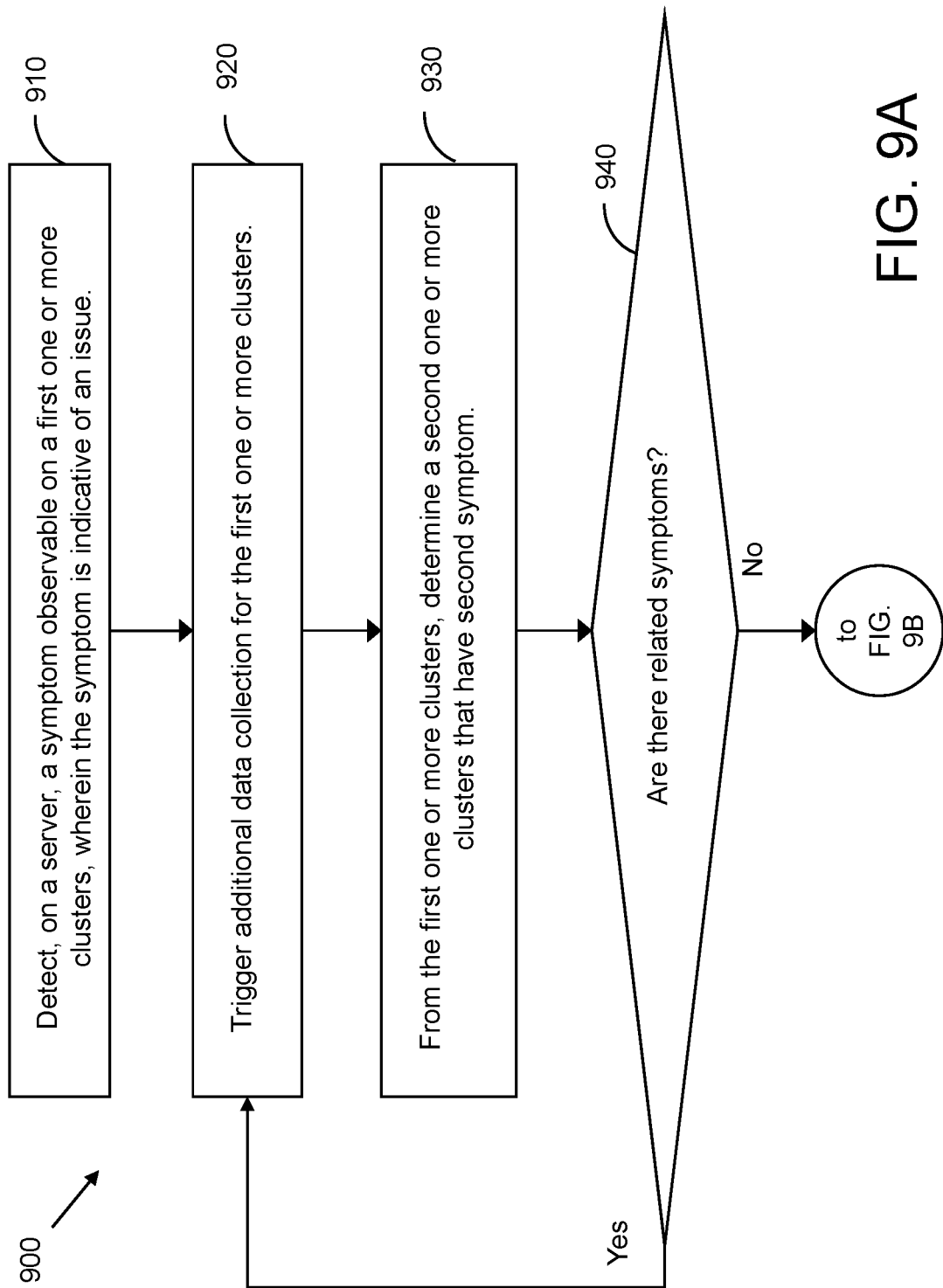

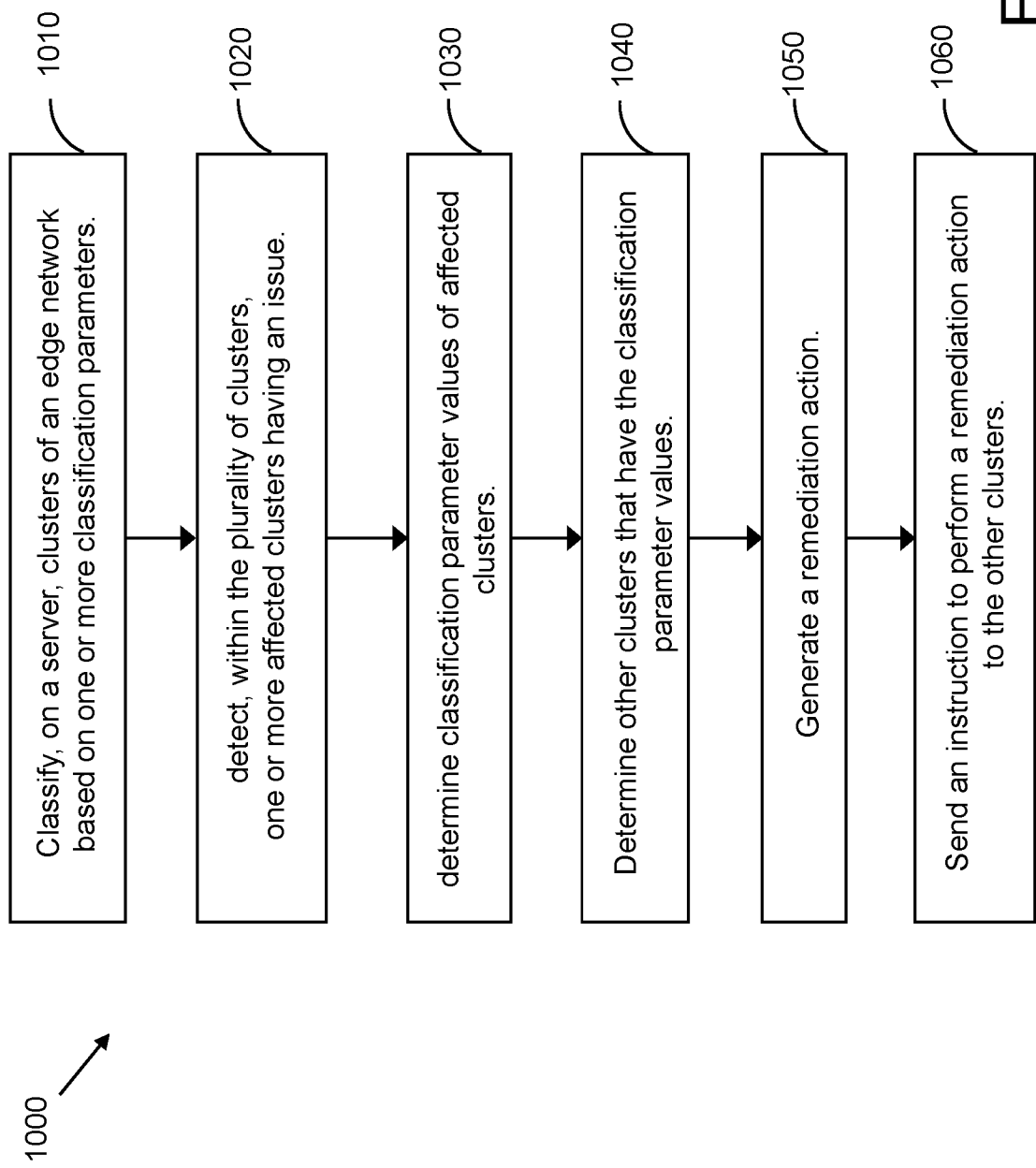

RECOMMENDATION ENGINE BASED ON CLASSIFICATION OF VIRTUALIZED WORKLOAD

CROSS-REFERENCE TO RELATED APPLICATION

This application is related to and claims priority under 35 U.S. § 119(e) the U.S. Provisional Patent Application No. 63/107,983, filed Oct. 30, 2020, titled "CLOUD-CONTROLLED CONFIGURATION OF EDGE PROCESSING UNITS," and the U.S. Provisional Patent Application No. 63/121,185, filed Dec. 3, 2020, titled "CLOUD-CONTROLLED CONFIGURATION OF EDGE PROCESSING UNITS," the entire contents of which are incorporated herein by reference for all purposes.

BACKGROUND

Virtual computing systems are widely used in a variety of applications. Virtual computing systems include one or more host machines running one or more entities (e.g., workloads, virtual machines, containers, and other entities) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

Various embodiments disclosed herein are related to a non-transitory computer readable storage medium. In some embodiments, the medium includes instructions stored thereon that, when executed by a processor, cause the processor to classify, on a cloud server, a plurality of clusters of an edge network based on one or more classification parameters. In some embodiments, the plurality of clusters includes a first cluster and a second cluster. In some embodiments, the medium includes instructions stored thereon that, when executed by a processor, cause the processor to detect that the first cluster in a first datacenter of the edge network has an issue, determine a classification parameter value of the first cluster, and determine that the second cluster in a second datacenter of the edge network has a second classification parameter value within a predetermined amount of the classification parameter value. In some embodiments, the second datacenter is different than the first datacenter. In some embodiments, the medium includes instructions stored thereon that, when executed by a processor, cause the processor to send an instruction to the second cluster to perform a remediation action.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 3 is an example block diagram of a server side of a network in the virtual computing system of FIG. 1, in accordance with some embodiments of the present disclosure.

FIG. 4 is an example block diagram of the cloud control plane of FIG. 3, in accordance with some embodiments of the present disclosure.

FIG. 5 is an example flowchart of a method, in accordance with some embodiments of the present disclosure.

FIG. 6 is an example flowchart of a method, in accordance with some embodiments of the present disclosure.

FIG. 7A is an example flowchart of a method, in accordance with some embodiments of the present disclosure.

FIGS. 8A-8B are an example flowchart of a method, in accordance with some embodiments of the present disclosure.

FIGS. 9A-9B are an example flowchart of a method, in accordance with some embodiments of the present disclosure.

FIG. 10 is an example flowchart of a method, in accordance with some embodiments of the present disclosure.

Figure 1:
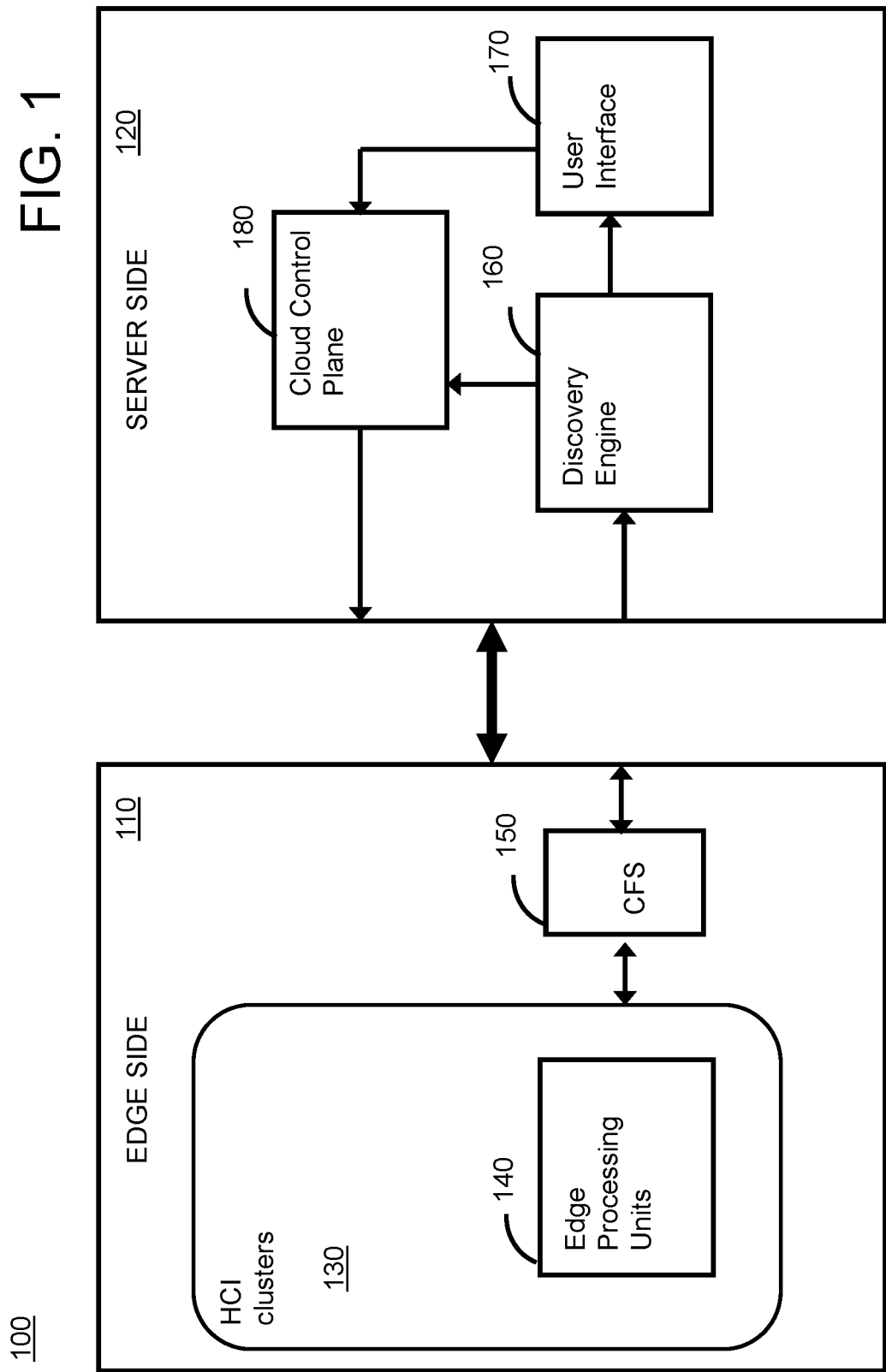
FIG. 1 is an example block diagram of a virtual computing system including a server side and an edge network side, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

An HCI cluster is one or more virtualized workloads (one or more virtual machines, containers, etc.) that run services/applications/operating systems by using storage and compute resources of one or more nodes (e.g., computers, physical devices) which are virtualized through a hypervisor (e.g., host). Thus, the cluster refers to the cluster of physical nodes as well as the cluster of workloads. The cluster can be located in one node, distributed across multiple nodes in one data center (on-premises) or cloud, or distributed across multiple data centers, multiple clouds or data center-cloud hybrid. At least one of the workloads (e.g., a controller virtual machine or container) in the cluster runs core services that manages and maintains the cluster, including a cluster manager, a health/wellness check manager, an I/O storage manager, and the like. In some embodiments, a workload manages multiple clusters. As part of the health check, an HCI cluster employs edge processing units 140 to collect and process data about the nodes and services running on the clusters and alert customers/users of the clusters when performance issues (e.g., excessive latency, lack of resources, non-availability, lack of fault tolerance, lack of replication, lack of consistency, one or more nodes are down, need for upgrade, etc.) arise.

One problem is that the core services are typically packaged as a bundle (like an operating system) and upgrading the entire bundle of services is very slow, disruptive, and resource intensive. In particular, edge processing units need configuration updates when they generate false positives (e.g., incorrect alerts/notifications) regarding the performance of the clusters. What is needed is a way to strategically update the configuration of specific services of specific clusters without having to upgrade the version of bundled services.

The present disclosure is generally directed to a telemetry platform for HCI clusters with intelligent edge processing units. In some embodiments, the system dynamically pushes new configurations from a cloud server to edge processing systems running in a virtualized hyper-converged environment in a canary manner and has the capability to rollback these configurations dynamically from the cloud server. In an exemplary embodiment, a cloud server collects service data from various products and deployments across datacenters and different environments of a virtualized network. The system executing on the virtualized network may run edge processing units at edges of the network to process data upfront and send summarized data to the cloud server. Advantageously, the dynamic edge systems may update configurations on the edge to stop false positives, to add new signatures, or to change the configuration of existing signatures. Moreover, edge processing units may collect meaningful data while at the same time limiting the amount of data collected and send to the cloud server. In this manner, processing of data can be maintained closer to where the data is generated, reducing the amount of data communicated to the cloud server and providing flexibility to consume processing results and outputs on the edge device along with the clout.

According to an exemplary embodiment, each edge processing unit has its own configuration which is used by the edge processing system to control the behavior of the intelligent edge device in a virtualized, hyper-converged environment. These configurations may control the amount of data processed by the intelligent edge device, processing logic and rules run on the edge device, frequency of the processing rules, and also the amount of processed data sent to the cloud server.

FIG. 1 illustrates a system 100 including an edge network side 110 and a server side 120. The edge network side (e.g., edge side, edge, edge system, client side, etc.) 110 includes one or more HCI (hyper-converged infrastructure) clusters 130 and one or more collector framework services (CFS) 150. The server side (e.g., server, cloud, cloud side, cloud server, etc.) 120 includes a discovery service 160, a user interface 170, and a cloud control plane 180. The edge network side 110 and the server side 120 are in communication. The HCI clusters 130 include edge processing units 140, and the CFS 150 receives operational data (e.g., logs/configurations/metrics) of the HCI clusters 130 from the edge processing units 140. In some embodiments, the edge processing units 140 and the CFS 150 are services running on the HCI clusters 130. The CFS 150 can generate health/wellness/state/processed data (e.g., monitoring data, summary of configurations, alerts, summary of metrics, events, summary of logs, blobs) based on the operational data and send the health data to the server side 120 for further processing, storage, and/or other operations. Further, the CFS 150 and/or the server side 120 may identify when more or different health data is needed and when false positives (e.g., an alert/indication of an issue/problem that does not exist) are received. In some embodiments, there is one of the CFS 150 corresponding to every one of the HCI clusters 130 and each of the CFS 150 is coupled between its corresponding HCI cluster 130 and the server side 120. In some, embodiments, each of the CFS 150 runs on its corresponding HCI cluster 130.

The server side 120 can be connected to a plurality of edge network sides such as the edge network side 110. Each edge network side sends health data of its HCI clusters 130 to the server side 120 using a telemetry platform. The health data is analyzed by the discovery service 160 at the server side 120. The health data can be analyzed for multiple purposes, one of which is to detect any false positives generated by any of the edge processing units 140. Once a false positive is detected by the discovery service 160, the cloud control plane 180 at the server side 120 automatically defines a new configuration.

Figure 2:
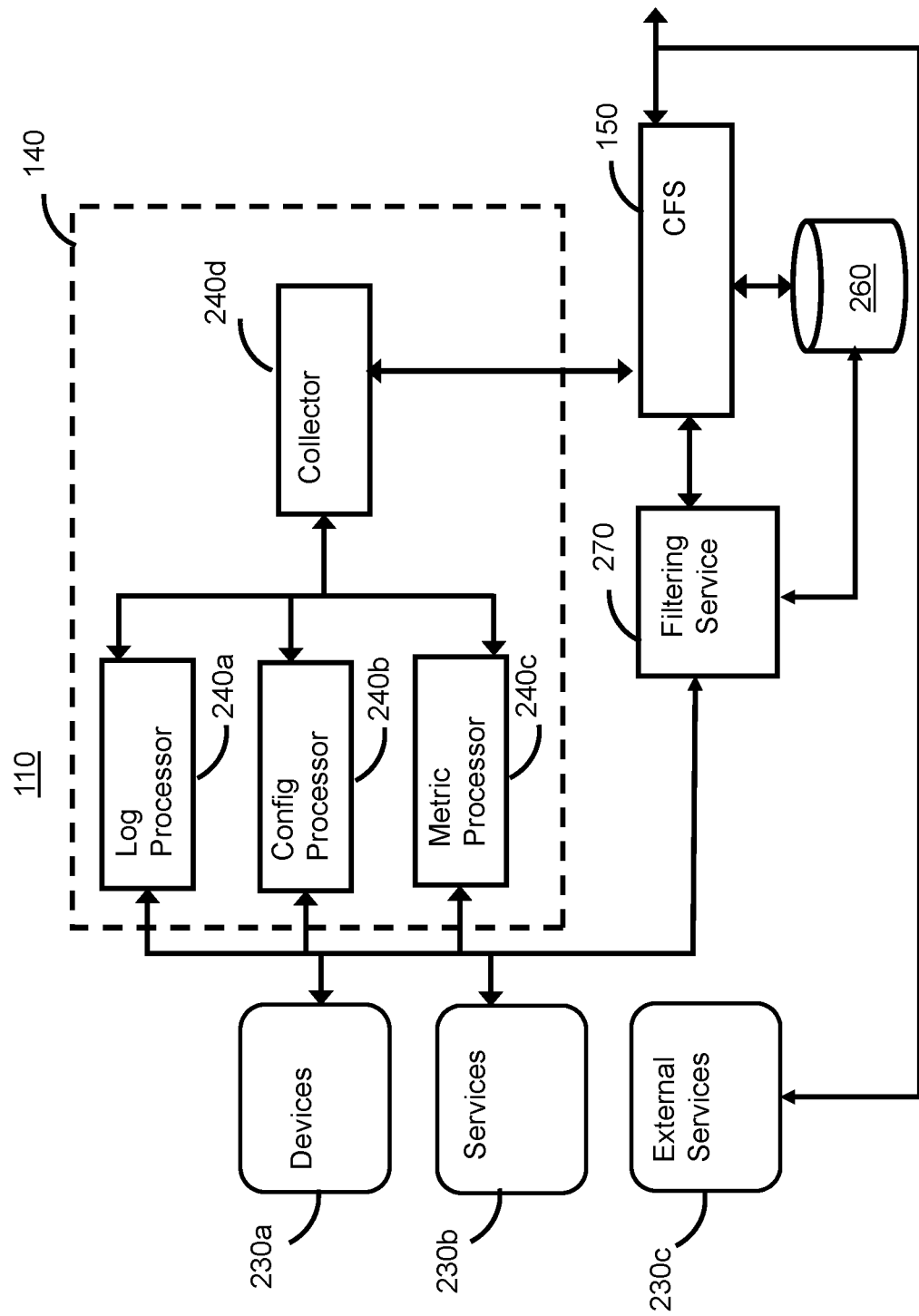
FIG. 2 is an example block diagram of an edge network side of a network in the virtual computing system of FIG. 1, in accordance with some embodiments of the present disclosure.

FIG. 2 illustrates an exemplary edge network side 110, including devices 230*a*, services 230*b*, and external services 230*c*. The devices (e.g., edge devices) 230*a* can include physical nodes of the clusters 130 or physical components thereof. The services 230*b* may include services running as part of one or more virtualized workloads that run on top of a hypervisor connecting the workloads to resources of a cluster of physical nodes. The services 230*b* may include a cluster manager, a cluster health check, a storage I/O (input/output) manager, a concurrent processing (e.g., map-reduce) manager, a cluster configuration manager, an object storage service, etc. Some of the services 230*b* may be packaged as a bundle of core services (e.g., scripts) that may behave similar to operating system services. The external services 230*c* may include services that interact with services 230*b*. The devices 230*a*, services 230*b*, external services 230*c* are collectively referred to as HCI clusters 130.

The edge processing units 140 are in communication with devices 230*a*, services 230*b* and include log processor 240*a*, config (configuration) processor 240*b*, metric processor 240*c*, and the collector 240*d*. The log processor 240*a* may operate on logs generated from the services 230*b* (e.g., a user management request coming on a cluster), aggregate the logs, and summarize any issues, e.g., by correlating the logs with other data/metrics/configurations on the system. The config processor 240*b* may operate on configurations of the HCI clusters 130 and summarize any issues. For example, the config processor 240*b* may detect that a cluster is configured with 20 MB storage instead of 20 GB storage, or that some VMs (virtual machines) are not protected (e.g., not enough replication factor or fault tolerance). The metric processor 240*c* may operate on metrics of the HCI clusters 130. The collector 240*d* is in communication with the log processor 240*a*, the config processor 240*b*, and the metric processor 240*c*. The collector 240*d* may aggregate their respective logs, configs, and metrics, define the frequency of collection, how much to aggregate, and send (e.g., publishes, pushes) the aggregated/raw data to the server side 120 (via the CFS 150).

The CFS 150 is in communication with the collector 240*d*. The CFS 150 may instruct one or more edge processing units 240 to change the configuration they have. Such an instruction can result from detecting errors/issues/events, identifying an upgrade need, identifying a state change such as an increase in nodes or a change in a hypervisor type, or any of a variety of other triggers to change the configuration. In at least one embodiment, edge processing units 140 collect data from the HCI clusters 130 and the CFS 150 identifies false positives from the collected data. False positives from the data collect can be a trigger for changing the configuration of an edge processing units 140. The CFS 150 can add or modify existing rules used by the edge processing units 240 to correct for errors and false positives. The edge network side 110 includes a database 260 in communication with the CFS 150. The database 260 can store data collected/received by the CFS 150. The edge network side 110 includes one or more filtering service 270. In some embodiments, each node includes its own filtering service 270. Each of the filtering services 270 can filter configuration updates received or generated at the CFS 150 based on whether the configuration updates apply to (e.g., match with the parameters of) a node corresponding to the particular filtering service 270.

The edge network side 110 (e.g., CFS 150 or the edge processing units 140) or the server side 120 can determine that an edge processing unit 140 configuration update is needed (e.g., more data is needed from the HCI clusters 130 than is collected by default). In some embodiments, the CFS 150 detects a state change (e.g., configuration state change, event) in the corresponding HCI cluster 130. For example, the configuration state changes if a new node gets added to the HCI cluster 130. Also, the configuration state changes if a hypervisor or a service gets upgraded or changes vendors. When the state changes, the edge processing units 140 (and/or in some cases, the devices 230a and/or services 230b) may receive a configuration update from the CFS 150 (e.g., without action from the cloud). For example, if a hypervisor vendor changes, the configuration update may change the frequency of a process/check that is running on the edge. In some embodiments, the server side 120 processes data collected from the CFS 150, generates a configuration update for the edge processing units 140, and sends the configuration update to the CFS 150.

Once a determination for a configuration update is made, in some embodiments, the edge network side 110 selects a configuration update corresponding to the new configuration state. In some embodiments, which configuration update to select is determined by override configuration rules. In some embodiments, a first one or more override configuration rules are part of the HCI cluster 130 release/base package, a second one or more override configuration rules are sent to the CFS 150 by the server side 120, and a third one or more override configuration rules are sent to the CFS 150 by a user/administrator. In some embodiments, the override configuration rules from the various sources conflict with each other. In some embodiments, the CFS 150 merges/resolves the conflicting override configuration rules (referred to as "merge logic"). The CFS 150 may defer to the server side 120 rules. For example, a cloud configuration request may indicate to override irrespective of the release package rules, or may indicate not to override if there is any conflict. The CFS 150 may implement the most conservative rule (e.g., the rule that results in more data collected). For example, each of the configuration rules may specify a frequency for collecting data on the edge, and the CFS 150 may select the highest specified frequency for the configuration update.

In some embodiments, as part of the update, the edge network side 110 changes or increases the type of data collected or the frequency of the data collected by the edge processing units 140 and from the clusters 130. The edge network side can 110 determine the subset of edge processing units 140 to apply the update config to. The edge network side can 110 determine whether to configuration update is time bound, and if so, what the duration of the configuration update is. The edge network side can 110 determine whether and when to rollback changes. The edge network side 110 can determine the version of the configuration update.

In some embodiments, the edge network side 110 receives an updated configuration from the server side 120. In some embodiments, the edge network side 110 decides or controls some of the aspects of the config update (e.g., whether to rollback, whether the update is timebound, canary deployment, etc.). In some embodiments, the server side 120 decides or controls those aspects of the config update.

As described above, the edge processing units 240 use one or more configurations (e.g., edge processing unit configurations, etc.). The configurations may determine what information (e.g., data, configurations/logs/metrics) to collect, where to collect the information from, how to collect the information, how granular to collect this information, when to collect the information, how often to collect the information, when and where to push the processed information. As part of the cluster services, the edge processing unit 140 specific configuration default may be included. To make the telemetry collection more intelligent, edge processing units 140 may receive events which trigger the edge processing units 140 to act smart.

The server side 120 can push new configurations based on the calculated health of the cluster/service or the state of the cluster/service or some external events which influence these configuration setting. For example, if the cluster has an open SFDC (sales force dot com) case/ticket created which is an external state triggered, then the server side 120 can trigger the edge processing units 140 to start collecting more granular metric information. The server side 120 can reset the state to normal when the SDFC case is closed and the server side 120 verifies that the problem no longer exists after the fix. If the cluster has an open SFDC case regarding performance of core services, the server side 120 can trigger the edge processing units 140 to start collecting more granular information and extra information of the cluster for the specified time bound. If there is a security issue detected for the cluster on the server side 120, the server side 120 can trigger the edge processing units 140 to make changes to what is collected.

The edge processing units 140 at the edge network side (running in the cluster) can increase and decrease the metric frequency from a first time period (e.g., 15 minutes) to a second time period (e.g., 5 minutes) when the cluster health is below a predetermined threshold (e.g., when an alert is raised). This can be indicated in the user interface (e.g., cloud portal) 170 by displaying a red color in a visual element, or the like. The edge processing units 140 can revert to the first time period once the cluster health is above the predetermined threshold (e.g., when the issue is resolved). This can be indicated in the user interface 170 by displaying a green color in a visual element, or the like. Thus, the cluster health can be visually indicated by a color.

FIG. 3 illustrates a server side 120 of a network in the virtual computing system of FIG. 1. The server side 120 includes a server endpoint 310 and a data processing pipeline 320 in communication with the server endpoint 310. The data processing pipeline 320 may receive incoming data, perform schema validation, convert data into JSON streams, and persist all incoming data receives from different devices and services.

The server side 120 includes a data repository (e.g., data lake, database, etc.) 130. In some embodiments, the ingested/received data from the data processing pipeline 320 is stored in the data repository 330. The discovery service 160 may perform analytics on the data in the data repository 330. The cloud control plane 180 may receive the output of the discovery service 160. The discovery service 160 may send notifications (e.g., email, slack) to the user interface 170 and automatically create or recommend creating open tickets (e.g., in an issue tracking service).

FIG. 4 illustrates the cloud control plane 180, in accordance with some embodiments. The cloud control plane 180 includes a configuration update processor 410, an original configuration database 420, a desired configuration database 422, a requests database 424, and a filtering service 430. Once a state change or an issue (e.g., false positive) is detected by the discovery service 160, the cloud control plane 180 at the server side 120 may automatically define a new configuration to tweak the existing configuration of the edge processing units 140 and add/modify existing rules used by the edge processing units 140 to update the existing edge processing units 140. The filtering service 430 may filter the edge processing units 140 to a subset that will receive/apply the update, via the CFS 150 (which can, additionally, or alternatively, have its own filtering service). In some embodiments, the new configurations are stored in the desired configuration database 422.

In an exemplary embodiment, as part of defining a new configuration, the server side 120 (e.g., the cloud control plane 180) can filter for the environments where a configuration has to be updated. State changes/issues/false positives might be impacted on some of the specific cluster/node environments based on the nature of the issue. The server side 120 may filter out and isolate the impacted edge environments where a state change/issue/false positive might have occurred. The server side 120 may send the configuration updates to edge processing units 140 for some of the filtered environments across all products and across all hybrid deployments on edge.

In some embodiments, to be able to get the configuration updates from the cloud, the server side 120 hosts a pub-sub (publish-subscribe) system 360 as part of its data processing pipeline 320, or in some embodiments, the cloud control plane 180. In some embodiments the server side 120 receives or generates a request or command to update the configuration of the edge processing system based on values of filter parameters (e.g., filter parameters that filter clusters based on the configuration state). The request to update may be published to a stream on the pub-sub system. Each client (e.g., each of the HCI clusters 130) may subscribe to particular streams based on the current state of the client.

In some embodiments, supported filter parameters include a cluster health check version (client version), hypervisor type, hypervisor version, a number of nodes, platform models, hardware type, a core services version, BIOS (basic input/output system) version, firmware version, LCM (life cycle manager) version. The pub-sub system 360 may push config update requests for the clusters 130 or the edge processing units 140 corresponding to the clusters 130 based on the current state of the system represented by a complex SQL. Script execution can happen either on the client or the server.

This kind of dynamic filtering mechanism can be implemented with server side filtering, edge filtering, dynamic filtering based on a script run on edge, or filtering based on data received from the edge. Server side filtering: when the edge system subscribes to receive the configuration updates, it can publish some of its current state to the pub-sub server. Based on this state, the pub-sub system 360 may determine the streams to which a client subscribes to. The pub-sub system/platform/server 360 or the filtering service 430 may create the streams to support the server side filtering. The pub-sub server 360 or the filtering service 430 may provide the list of subscriptions/streams based on the client's current state at any given point of time. For example, any cluster having first type hypervisor vendors subscribe to a first stream. When configuration updates are ready for that hypervisor vendor type (e.g., the edge processing units 140 of the clusters having that hypervisor vendor type), the pub-sub system 360 may publish the configuration update on that stream. Whenever the current state of the system is changed, the client may get a notification and it re-publishes its state, and the pub-sub server 360 or the filtering service 430 may return a new list of streams to which it subscribes to. Thus, the pub-sub server or the filtering service 430 can maintain a mapping of configuration state to streams.

When a new cluster comes up, the new client may publish its current state. Based on the current values of the filtering parameters, the server may return the list of streams that the client can subscribe to. The client (e.g., the CFS 150) may get the desired configuration of the edge subsystems (e.g., the edge processing units 140 corresponding to the CFS 150) after the filter has been applied on the server side and the edge subsystems are updated to use the desired configuration. The edge system may keep a watch on the hyperconverged edge system to get notified if the state of the system is changed. Whenever the state is updated, the client may re-publish the current values to the server and updates its list of subscriptions. Since the current state of the system is changed, the client can revert the configuration updates it received previously since those updates may no longer be applicable. At this point, the client may get a new desired configuration for the subsystem. The edge subsystem can be updated to use the new desired configuration.

In some embodiments, the edge side filtering (e.g., client side filtering) is applied dynamically on the edge. In some embodiments, server side filters have first state parameters (e.g., server side filter parameters) and edge side filters have second state parameters (e.g., client side filter parameters). Once the client (e.g., cluster or node) receives the configuration update from the server, it may check for edge filtering parameters and apply the update only if the values of the edge filtering parameters match with parameters of the configuration update. One reason to do edge side filtering is that there are many streams/filtering parameters (e.g., cluster management service version, cluster health check version, number of nodes), and creating streams for every filtering parameter on the server side 120 may be a unacceptably large resource overhead for the server side 120. Thus, the system 100 can be optimized by applying some filtering on server side 120 and some filtering on edge network side 110.

In some embodiments, at each node of the cluster, a filtering service 270 determines what is the current configuration state for that node and what are the configuration updates that the CFS 150 received from the server side 120. In some embodiments, the desired configuration is received by the edge network side 110 after the server side 120 filter has been applied. This configuration may include the delta of the desired configuration for various values of edge filtering parameters.

The config client (e.g., the CFS 150) may store the desired configuration in a DB (database) on the edge. The desired configuration may have a priority assigned in case of conflicts while applying various filters. The filtering service 270 for each node may identify the applicable desired configuration based on the current values of edge parameters. The filtering service 270 may parse/traverse the list of desired configurations (e.g., stored in the edge database), e.g., sequentially, in order of priority, or in order of time that configuration was created/stored. The filtering service 270 may apply the desired configuration based on the current values of the edge filtering parameters for that node.

An example of parsing is included herein. A request may include pairs of filters and new configuration states, in order of priority. For example, a first filter is cluster management service version<5.10, a first new state is to update collection frequency to 15 minutes, a second filter is health check service version=3.9, a second new state is to not raise an alert, a third filter is hypervisor=first-type, and a third new state is to update collection frequency to 15 minutes in which the first filter has a higher priority than the second filter, and the second filter has a higher priority than the third filter. On the edge side, a first cluster satisfied all the filters (first, second, and third). Then, the first cluster's final state will be to not raise an alert and to update collection frequency to 15 minutes.

The config client and/or the filtering service 270 at each node, as well as the filtering service 430, can maintain the complete config updates list it receives from the cloud, along with all edge filters. In some embodiments, both the server side filtering and the edge side filtering feedback to the config update processor 410 information about the configuration updates, such as to which clusters each of the configuration updates are applicable. The config client may keep a watch on the edge system to get notified when any of the edge filtering parameters are changed. Whenever an edge filtering parameter is changed, the config client may re-apply the config updates. The config client may determine the config updates based on the new values of the edge filtering parameters. In some embodiments, the config client may revert the config updates/deltas it made because of the previous state of the system.

The above mechanisms may work for any of the filter parameters which the system 100 knows about. There may be a need to support filtering dynamically based on a script which is run on edge. Along with the config updates, the edge may receive a script which needs to be executed to determine if the system is applicable after applying some complex filtering logic. The config client may initiate a watch on the current state of the edge system, and the config client can re-evaluate the script if any of the values of the current parameters change. This can enable the client to dynamically receive the filtering logic and run the processing on the edge and apply the appropriate config updates.

Filtering may be applied on the cloud based on the current state of each edge subsystem which is collected through the edge processing units 140. In some embodiments, the filtering applied on the cloud has a dependency on the data being collected, streamed, and processed in the data processing pipeline in the server side 120 before this evaluation can be done.

Thus, the system may enable supporting the configuration not only based on client version but also any other filtering parameters which are predefined as well as might be added dynamically (both on server and edge) in a virtualized hyper-converged environment.

Referring to FIG. 3, in an exemplary embodiment, the server side 120 provides a variety of capabilities (e.g., in addition to filtering). First, the server side 120 (e.g., the cloud control plane 180) can provide canary deployments of configuration changes. A canary deployment, or deployment to a subset, may control a sudden impact of the configuration change and test out the changes. A server at the server side 120 may support canary deployments for the configuration changes. The server side 120 may provide auditing capabilities of the configuration changes. Depending on the embodiment or the selected control, each configuration change can be audited per cluster and also for the applicable filters.

The user interface 170 may provide customer facing controls to enable/disable the configuration changes. The server side 120 may provide versioning of the configuration updates. The server side 120 may provide rollback capabilities for the config update requests. In case the configuration update request introduced any regressions, the server side 120 can roll back the changes, including rollback on the edge and rollback on the cloud.

The server side 120 may provide time bound configuration updates. In scenarios where the plane 190 detects an issue on the cloud and determines that extra data is to be collected until the issue is resolved, the server side 120 can trigger a time bound configuration update for the edge processing units 140. Such a configuration can control the time until the configuration update would be valid.

Referring to FIG. 4, the cloud control plane 180 includes a remote command controller (RCC) 440. In some embodiments, the RCC server 440 exposes an API (application programming interface) which is called by the discovery service 160 to collect diagnostic information from the cluster. This can be used to run any commands on the cluster. The RCC server 440 may create the request and store it in a DB. The CFS 150 may poll the RCC server 440 every predetermined time period (e.g., 2 minutes) to check if any new request is available for the cluster. In case a new request exists, the RCC server 440 may send the request to the CFS 150. The CFS 150 may send this request to the edge processing unit 140 which executes the required command(s). A command output may be sent to RCC server 440 using HTTP multipart.

In an exemplary embodiment, the server side 120 (e.g., the RCC 440 and/or the user interface 170) can send commands to the edge network side 110. There are use cases in which a user at the user interface 170 (e.g., administrator/site reliability engineer/support team) wants to get some extra information from the edge for debugging and troubleshooting purposes which the user can use to resolve the customer issues faster. Use cases include running commands from cloud with some dynamic arguments to debug any open issues, running commands to collect extra data at any given time to help in better detection of issues, and running commands from cloud to take any remediation actions on the edge.

In some embodiments, the server side 120 provides a CLI (command line interface) like interface (e.g., in the RCC server 440 and/or the user interface 170) to be able to execute the commands on the virtualized hyper-converged edge systems running in hybrid cloud environments. The interface can define some dynamic arguments to the command based on the current use cases. The interface can pass any shell commands with piping, etc.

A response to the command, including command outputs, may be sent to the RCC server 440 and/or the user interface 170. In some embodiments, the output may be a blob (binary, large object). The user (or the RCC server 440 and/or the user interface 170 based on instructions of the user) may determine whether the command output is to be parsed at the edge network side 110 or at the server side 120 (e.g., the data processing pipeline, the discovery service or the RCC server 440). An indication of where to parse the command output may be included in the command. In some embodiments, if the user needs a raw output, the server side 120 can parse the command outputs along with getting the raw output. This is needed to be able to run downstream analytics on top of the command outputs. In some embodiments, if the user only wants schematized output, or if the user or server side 120 determines that less resources should be consumed on the server, then the parsing can be achieved by pushing the parsing templates/plugin to the edge dynamically and parse the command outputs on edge. Parsing can be achieved by collecting the raw output from edge and enable a parsing template/plugin on cloud. The interface provides controls to be able to inject the data back into the data pipeline for further processing.

The interface can send the outputs based on the size of the command output/data. Each node (e.g., or service, bundle of services, etc.) independently runs the command and is responsible to send its outputs independently. In some embodiments, the transmission of the command output is based on the size of the data/output produced by the command on each node. In some embodiments, the node can send the output as one or more resumable chunked file uploads if the output is bigger than a predefined limit, or as one file upload (e.g., an HTTP request packet) to the server if the output is smaller than the predefined limit. This capability may offer each node to operate independently and handles any scenarios in which a bursty output is produced by the command on a particular node at any given time. This also enables the edge systems to be able to manage the life cycle of the outputs on each node.

The interface can add dynamic timeouts to the command execution for various use cases. For example, a node (or services on the node) is temporarily down/off/unavailable. The interface may run the command if the node is restarting or is temporarily down. In some embodiments, a node (or services on the node) is permanently down. The interface may not wait for a long duration for the node to come back up. In some embodiments, a few of the nodes in the cluster have intermittent or permanent connectivity issues to the cloud. In some embodiments, the cluster has intermittent or permanent connectivity issues to the cloud.

Thus, the interface may run the commands in the distributed manner without depending on any of the services. The command execution framework may work even if most of the other services are down. The interface may run commands when upgrades in progress. The interface can handle any intermittent/permanent node failures. The interface may run the commands dynamically with dynamic parameters in a hyper-converged virtualized hybrid environment. The interface may run the commands in a distributed environment, handling node failures (temporary or permanent), and handling any on-going upgrade/maintenance activities. The interface may run the commands in non-homogenous distributed environments and also run the commands on host.

The interface may control the parsing of the commands to be done on edge or on cloud. The interface may send the parsing template/plugin dynamically to the edge to enable parsing and drop some data from the command output if it's not needed. The interface is may dynamically send the outputs per node independently, based on the size of the output, and dynamically sending the outputs as chunked file uploads or sending it as an HTTP request.

While the foregoing description describes the server side 120 as performing some of the described operations, the CFS 150 can perform many of the same operations for the HCI clusters 130 and/or the edge processing units 140.

Referring to FIG. 3, in some embodiments, the server at the server side 120 e.g., the discovery service 160 and/or the cloud control plane 180) detects whether issues exist. In some embodiments, issues include that a node, service, or cluster is temporarily or permanently unavailable, that a service, device, or hypervisor upgrade is needed, that performance (e.g., I/O per second, number of I/O, CPU usage) is sub-optimal, that data is not sufficiently protected (e.g., replication factor or fault tolerance is too low), that false positives are being reported by the edge processing units 140, etc. Issues may exist in some state of the HCI clusters 130 or edge processing units 140. Based on data collected from multiple products in hyper-converged environments on the server, the server (e.g., the discovery service 160) may run analytics to detect any issue in the edge network side 110. The server can collect a subset of metrics and configuration information from the HCI clusters 130. The edge processing units 140 may process the data at the edge network side 110 and send the summarized information to the server endpoint 310.

For some issue detection logic, the server at the server side 120 may determine to collect more data that is not already collected by default. In such scenarios, the server (e.g., servers/services on the server side 120 such as the discovery service 160, the cloud control plane 180, or a combination thereof) may detect a subset of clusters 130 which are a probable list of customers where an issue may be happening. Based on the analytics, the server can detect a symptom of an issue, but it may not confirm the issue itself. Once the server detects a list of clusters where an issue may be happening based on the symptoms, the server may trigger an extra data collection from edge processing units 140 for these systems to confirm the issue. This may be an iterative process where the server narrows the subset of the clusters 130 by identifying them as having a symptom, collects more data, then repeats more iterations until all the symptoms have been analyzed. The subset of clusters who show all the symptoms are determined to have the issue.

Based on any detected symptoms, the server (e.g., the server side 120) can take several different actions. First, the server can enable extra data collection to confirm if the issue exists. In this case, extra data is sent continuously from the edge network side 110, based on the detected symptom. The server may run analytics on top of the collected data to confirm if the issue exists on the cluster. Second, the server may send a signal to the edge processing units 140 and/or the CFS 150 to execute workflows to confirm if the issue exists on the HCI clusters 130 and/or the edge processing units 140. In this case, the edge processing units 140 and/or the CFS 150 may execute issue detection logic and results are sent to the server. The results can be further processed on the server and are shown to the corresponding customer to take appropriate actions if applicable.

The server may send instructions to the edge processing units 140 on the edge network side which may run a workflow of rules and take decisions based on the result of individual steps in the workflow. The workflow may include various rules which need to be executed on top of the cluster configurations, logs and metrics. The result of the workflow execution can detect if an issue is hit on a particular environment or not.

The server may perform the detection analysis continuously to confirm a detected issue and to detect any changes in the state of the system. Even if according to the current state, the issue does not exist, the state may change. As such, the server may run the analysis on a cluster continuously as long as the symptom exists on the cluster. The server analysis may detect when the issue is resolved and then stops the analysis when the symptom is resolved.

Referring still to FIG. 3, the server side 120 includes a classification service 340, a recommendation service 350, and a recommendation database (DB) 352. In an exemplary embodiment, the classification service 340 runs on top of the data repository 330 and categorizes clusters based on certain feature vectors/classification parameters. These vectors can be based on a configuration state of these clusters, such as a number of virtual machines, a software version, a hypervisor type, a number of nodes, etc. The results of the categorization in the classification service 340 can be fed into a recommendation service 350. In some embodiments, the recommendation service 350 identifies parameters or the vectors based on which the clusters are dissimilar to each other. This identification may provide information regarding the clusters that are similar to each other in certain configuration parameters but differ in certain metrics.

In some embodiments, the recommendation service 350 identifies the difference in configuration between the two sets of clusters where the metric differs. That difference in configuration can be surfaced as a recommendation to improve the efficiency of the cluster with lower values for metrics. Advantageously, employing these classification and recommendations techniques may solve problems/issues in the virtualized workloads in data centers.

The recommendation system can be used to predict issues that are most likely to happen to a particular category of clusters. The classification service may categorize clusters based on certain feature vectors based on configuration state of these clusters. Then an analysis can be performed to figure out the various kinds of issues that have been identified for a large subset of clusters. The recommendation service can predict that other clusters which have not yet hit the issues are most likely to run into them. The service can provide recommendations for the other clusters to avoid running into the issue.

In some embodiments, described herein are contextual recommendations based on the current and previous state of the state along with the symptom being detected by the system. This may include cross-customer anomaly detection or cross-customer analytics. As described above, the classification service 340 may detect various conditions and the recommendation service 350 provides recommendations to the customer to remediate the same.

Contextual recommendations may be based on the current and previous state of the state along with the symptom being detected by the system. An example of this would be that the customer may have a cluster of VMs both affected by a particular issue. The discovery engine can recognize the type of cluster (e.g., a resource type of the cluster such as a compute or storage cluster, a version or type of the cluster management service, a version or type of hypervisor, etc.) from the telemetry data and appropriately select and format.

Each of the components (e.g., elements, entities) of the system 100 (e.g., the HCI clusters 130, the edge processing units 140, the CFS 150, the discovery service 160, the user interface 170, the cloud control plane 180, the edge database 260, the filtering service 270, the server endpoint 310, the data processing pipeline 320, the data repository 330, the classification service 340, the recommendation service, 350, the recommendation database 352, the pub-sub system 360, the config update processor 410, the original config database 420, the desired configuration database 422, the request database 424, the filtering service 430, and the RCC 440), is implemented using hardware, software, or a combination of hardware or software, in one or more embodiments. Each of the components of the system 100 may be a processor with instructions or an apparatus/device (e.g., server) including a processor with instructions, in some embodiments. In some embodiments, multiple components (e.g., the discovery service 160 and the cloud control plane 180) may be part of a same apparatus and/or processor. Each of the components of the system 100 can include any application, program, library, script, task, service, process or any type and form of executable instructions executed by one or more processors, in one or more embodiments. Each of the one or more processors is hardware, in some embodiments. The instructions may be stored on one or more computer readable and/or executable storage media including non-transitory storage media.

Referring now to FIG. 5, a flowchart of an example method 500 is illustrated, in accordance with some embodiments of the present disclosure. The method 500 may be implemented using, or performed by, the system 100, one or more components of the system 100, or a processor associated with the system 100 or the one or more components of the system 100. Additional, fewer, or different operations may be performed in the method 500 depending on the embodiment.

A processor (e.g., the discovery service 160 or the cloud control plane 180) identifies a first cluster on an edge network that has an issue and a second cluster on the edge network that has the issue (at operation 510). The issue may include a disk failure, high latency, CPU, I/O, or network contention, prevalence of bully VMs, low tolerance or replication factor, an out-of-date version of a disk firmware, hypervisor, cluster management service, or cluster health service, etc. In some embodiments, the processor is on a cloud server coupled to the edge network. In some embodiments, the processor identifies a first configuration update. In some embodiments, the first configuration update is to update a first configuration state (e.g., first configuration settings) of the first cluster to a second configuration state (e.g., second configuration settings). The processor sends the first configuration update to the first cluster (at operation 520). The processor receives feedback from the first cluster (at operation 530). The feedback includes data collected by the edge processing units in the first cluster. The feedback may indicate parameters indicating a health status of the first cluster such as latency, IOPS, throughput, CPU, I/O, or network usage, etc.

The processor determines whether the issue is resolved (at operation 540). The processor can determine whether the issue is resolved based on the feedback received from the first cluster. If the processor determines that the issue is resolved, the processor sends the first configuration update to the second cluster (at operation 550). If the processor determines that the issue is not resolved, the processor changes the first configuration update on the first cluster. Specifically, if the processor determines that the issue is not resolved, the processor determines whether a second configuration update is available (at operation 560). In some embodiments, the second configuration update is based on the feedback received from the first cluster.

If the processor determines that the second configuration update is available, the processor sends the second configuration update to the first cluster (at operation 570). If the processor determines that the second configuration update is not available, the processor rolls backs/reverts, or sends instructions/request to roll back/revert, the first configuration update such that the second configuration state of the first cluster is returned to the first configuration state that it had before the first configuration update. In some embodiments, the processor performs a remediation action in response to sending the first configuration update, determining that the issue is resolved, or determining that the issue is not resolved (e.g., download or install an update to a software/firmware, order a new disk to replace the failing disk, request a new service ticket to be opened, etc.)

Advantageously, the processor uses canary deployment to selectively apply configuration settings to clusters that are identified as having an issue. This is true even though all the clusters have a same software version (including those without the issue). Using canary deployment for configuration setting updates without having to update a software version for some or all of the clusters reduces overhead for resources and is conducive to scalable edge networks.

Various embodiments disclosed herein are related to a non-transitory computer readable storage medium. In some embodiments, the medium includes instructions stored thereon that, when executed by a processor, cause the processor to identify a first cluster and a second cluster. In some embodiments, each of the first cluster and the second cluster is on an edge network. In some embodiments, each of the first cluster and the second cluster has an issue. In some embodiments, the instructions cause the processor to send a first configuration update to the first cluster and, in response to determining that the issue is or is not resolved in the first cluster, send the first configuration update to the second cluster or change the first configuration update on the first cluster, respectively.

In some embodiments, the medium further includes instructions stored thereon that, when executed by the processor, cause the processor to receive, from the first cluster, data collected by edge processing units in the first cluster and determine that the issue is resolved in the first cluster based on the data collected by the edge processing units in the first cluster. In some embodiments, the medium further includes instructions stored thereon that, when executed by the processor, cause the processor to, in response to determining that the issue is not resolved, determine whether a second configuration update is available.

In some embodiments, the medium further includes instructions stored thereon that, when executed by the processor, cause the processor to, in response to determining that the second configuration update is available, send the second configuration update to the first cluster. In some embodiments, the first configuration update is to update a first configuration state of the first cluster to a second configuration state. In some embodiments, the medium further includes instructions stored thereon that, when executed by the processor, cause the processor to, in response to determining that the second configuration update is not available, send, to the first cluster, a request to revert to the first configuration state.

In some embodiments, the medium further includes instructions stored thereon that, when executed by the processor, cause the processor to perform a remediation action in response to determining that the issue is resolved. In some embodiments, the medium further includes instructions stored thereon that, when executed by the processor, cause the processor to determine that a third cluster has a same software version as the first cluster and the second cluster and determine that the third cluster does not have the issue even without receiving the first configuration update.

Various embodiments disclosed herein are related to an apparatus. In some embodiments, the apparatus includes a processor and a memory. In some embodiments, the memory includes programmed instructions that, when executed by the processor, cause the apparatus to identify a first cluster and a second cluster. In some embodiments, each of the first cluster and the second cluster is on an edge network. In some embodiments, each of the first cluster and the second cluster has an issue. In some embodiments, the memory includes programmed instructions that, when executed by the processor, cause the apparatus to send a first configuration update to the first cluster and, in response to determining that the issue is or is not resolved in the first cluster, send the first configuration update to the second cluster or change the first configuration update on the first cluster, respectively.

In some embodiments, the memory further includes programmed instructions that, when executed by the processor, cause the apparatus to receive, from the first cluster, data collected by edge processing units in the first cluster and determine that the issue is resolved in the first cluster based on the data collected by the edge processing units in the first cluster. In some embodiments, the memory further includes programmed instructions that, when executed by the processor, cause the apparatus to, in response to determining that the issue is not resolved, determine whether a second configuration update is available.

In some embodiments, the memory further includes programmed instructions that, when executed by the processor, cause the apparatus to, in response to determining that the second configuration update is available, send the second configuration update to the first cluster. In some embodiments, the first configuration update is to update a first configuration state of the first cluster to a second configuration state. In some embodiments, the memory further includes programmed instructions that, when executed by the processor, cause the apparatus to, in response to determining that the second configuration update is not available, send, to the first cluster, a request to revert to the first configuration state.

In some embodiments, the memory further includes programmed instructions that, when executed by the processor, cause the apparatus to perform a remediation action in response to determining that the issue is resolved. In some embodiments, the memory further includes programmed instructions that, when executed by the processor, cause the apparatus to determine that a third cluster has a same software version as the first cluster and the second cluster and determine that the third cluster does not have the issue even without receiving the first configuration update.

Various embodiments disclosed herein are related to a computer-implemented method. In some embodiments, the method includes identifying, by a processor, a first cluster and a second cluster. In some embodiments, each of the first cluster and the second cluster is on an edge network. In some embodiments, each of the first cluster and the second cluster has an issue. In some embodiments, the method includes sending a first configuration update to the first cluster and, in response to determining that the issue is or is not resolved in the first cluster, sending the first configuration update to the second cluster or change the first configuration update on the first cluster, respectively.

In some embodiments, the method further includes receiving, from the first cluster, data collected by edge processing units in the first cluster and determining that the issue is resolved in the first cluster based on the data collected by the edge processing units in the first cluster. In some embodiments, the method further includes, in response to determining that the issue is not resolved, determining whether a second configuration update is available.

In some embodiments, the method further includes, in response to determining that the second configuration update is available, sending the second configuration update to the first cluster. In some embodiments, the first configuration update is to update a first configuration state of the first cluster to a second configuration state. In some embodiments, the method further includes, in response to determining that the second configuration update is not available, sending, to the first cluster, a request to revert to the first configuration state. In some embodiments, the method further includes, performing a remediation action in response to determining that the issue is resolved.

Referring now to FIG. 6, a flowchart of an example method 600 is illustrated, in accordance with some embodiments of the present disclosure. The method 600 may be implemented using, or performed by, the system 100, one or more components of the system 100, or a processor associated with the system 100 or the one or more components of the system 100. Additional, fewer, or different operations may be performed in the method 600 depending on the embodiment. In some embodiments, one or more operations of the method 600 are combined with one or more operations of at least one of the method 500.

A processor (e.g., the CFS 150) on an edge network detects a configuration state change of a cluster including one or more edge processing units. In some embodiments, the state change includes at least one of adding a node, or upgrading a software, or a change in health status (e.g., detecting a failure of a disk) (at operation 610). The processor identifies a plurality of first configuration override rules from a first source and a plurality of second configuration override rules from a second source (at operation 620). For example, the processor receives the first configuration override rules from services in the cluster and the second configuration override rules from the cloud (e.g., the server side 120). In some embodiments, the plurality of first configuration override rules are conflicting with the plurality of second configuration override rules. For example, the plurality of first configuration override rules may specify a first rate (e.g., frequency) at which an edge processing unit is to collect data and a first type of data to collect, whereas the plurality of second configuration override rules may specify a second rate at which an edge processing unit is to collect data and a second type of data to collect.

The processor merges at least one first configuration override rule with at least one second configuration override rule to generate a plurality of third configuration override rules (at operation 630). For example, the processor may merge the first configuration override rule that specifies the first rate at which the edge processing unit is to collect data and the second type of data to collect. In some embodiments, the merge is on a rule-by-rule basis. For example, the rate of data collection is a first rule that includes multiple parameters including (a) whether to check for CPU and memory usage, (b) whether to flag errors, and (c) whether to send flags to the cloud. Thus, the merge is performed on the first rule by combining different parameters. This process can be repeated for all rules of a subsystem/service (e.g., cluster health check service) or all the services of a cluster. In some embodiments, the processor defers to the configuration override rules received from the cloud. In some embodiments, the processor selects the most conservative configuration update (e.g., a highest rate at which to collect operational data from the services of the cluster).

The processor updates a configuration of the edge processing using the plurality of third configuration override rules (at operation 640). The processor collects data from the edge processing units in accordance with the configuration update (at operation 650). The processor sends the data to a server coupled to the edge network (at operation 660). In some embodiments, the server receives the data for further processing. In some embodiments, the server determines an action based on the state change (e.g., send another configuration update, send a new version of software to the cluster on the edge as part of an upgrade, order a new disk to replace the failing disk, open a new service ticket, etc.).

In some embodiments, the processor monitors the edge processing units. In some embodiments whether the configuration update causes an issue (e.g., an increase in latency, a decrease in throughput, an increase in CPU, I/O, or network consumption, etc.). In some embodiments, upon determining that the configuration update causes an issue, the processor initiates a rollback of the configuration state, independent of the cloud.

Various embodiments disclosed herein are related to a non-transitory computer readable storage medium. In some embodiments, the medium includes instructions stored thereon that, when executed by a processor, cause the processor to detect, on an edge network, a state change of a cluster including one or more edge processing units, identify a plurality of first configuration override rules from a first source and a plurality of second configuration rules from a second source, merge at least one first configuration override rule with at least one second configuration override rule to generate a plurality of third configuration override rules, update a configuration of the one or more edge processing units using the plurality of third configuration override rules, and collect data from the one or more edge processing units in accordance with the configuration update.

In some embodiments, the first source is a service within the cluster and the second source is a cloud server coupled to the edge network. In some embodiments, at least a third configuration override rule of the plurality of first configuration override rules is conflicting with at least a fourth configuration override rule of the plurality of second configuration override rules.

In some embodiments, the medium further includes instructions stored thereon that, when executed by the processor, cause the processor to select a most conservative configuration override rule of the third configuration override rule and the fourth the third configuration override rule to include in the plurality of third configuration override rules. In some embodiments, the medium further includes instructions stored thereon that, when executed by the processor, cause the processor to defer to a fifth configuration override rule from a cloud server coupled to the edge network to determine which of the third configuration override rule and the fourth the third configuration override rule to include in the plurality of third configuration override rules.

In some embodiments, the medium further includes instructions stored thereon that, when executed by the processor, cause the processor to, in response to updating the configuration, perform at least one of sending another configuration update, sending a new version of software to the cluster as part of an upgrade, ordering a new disk to replace a failing disk, or opening a new service ticket. In some embodiments, the medium further includes instructions stored thereon that, when executed by the processor, cause the processor to determine that the configuration update causes an issue and initiate a rollback of a configuration state of the cluster, independent of a cloud server coupled to the edge network.

Various embodiments disclosed herein are related to an apparatus. In some embodiments, the apparatus includes a processor and a memory. In some embodiments, the memory includes programmed instructions that, when executed by the processor, cause the apparatus to detect, on an edge network, a state change of a cluster including one or more edge processing units, identify a plurality of first configuration override rules from a first source and a plurality of second configuration rules from a second source, merge at least one first configuration override rule with at least one second configuration override rule to generate a plurality of third configuration override rules, update a configuration of the one or more edge processing units using the plurality of third configuration override rules, and collect data from the one or more edge processing units in accordance with the configuration update.

In some embodiments, the first source is a service within the cluster and the second source is a cloud server coupled to the edge network. In some embodiments, at least a third configuration override rule of the plurality of first configuration override rules is conflicting with at least a fourth configuration override rule of the plurality of second configuration override rules.

In some embodiments, the memory further includes programmed instructions that, when executed by the processor, cause the apparatus to select a most conservative configuration override rule of the third configuration override rule and the fourth the third configuration override rule to include in the plurality of third configuration override rules. In some embodiments, the memory further includes programmed instructions that, when executed by the processor, cause the apparatus to defer to a fifth configuration override rule from a cloud server coupled to the edge network to determine which of the third configuration override rule and the fourth the third configuration override rule to include in the plurality of third configuration override rules.

In some embodiments, the memory further includes programmed instructions that, when executed by the processor, cause the apparatus to, in response to updating the configuration, perform at least one of sending another configuration update, sending a new version of software to the cluster as part of an upgrade, ordering a new disk to replace a failing disk, or opening a new service ticket. In some embodiments, the memory further includes programmed instructions that, when executed by the processor, cause the apparatus to determine that the configuration update causes an issue and initiate a rollback of a configuration state of the cluster, independent of a cloud server coupled to the edge network.

Various embodiments disclosed herein are related to a computer-implemented method. In some embodiments, the method includes detecting, by a processor on an edge network, a state change of a cluster including one or more edge processing units, identifying a plurality of first configuration override rules from a first source and a plurality of second configuration rules from a second source, merging at least one first configuration override rule with at least one second configuration override rule to generate a plurality of third configuration override rules, updating a configuration of the one or more edge processing units using the plurality of third configuration override rules, and collecting data from the one or more edge processing units in accordance with the configuration update.

In some embodiments, the first source is a service within the cluster and the second source is a cloud server coupled to the edge network. In some embodiments, at least a third configuration override rule of the plurality of first configuration override rules is conflicting with at least a fourth configuration override rule of the plurality of second configuration override rules. In some embodiments, the method further includes selecting a most conservative configuration override rule of the third configuration override rule and the fourth the third configuration override rule to include in the plurality of third configuration override rules.

In some embodiments, the method further includes deferring to a fifth configuration override rule from a cloud server coupled to the edge network to determine which of the third configuration override rule and the fourth the third configuration override rule to include in the plurality of third configuration override rules. In some embodiments, the method further includes determining that the configuration update causes an issue and initiating a rollback of a configuration state of the cluster, independent of a cloud server coupled to the edge network.

Referring now to FIG. 7A, a flowchart of an example method 700 is illustrated, in accordance with some embodiments of the present disclosure. The method 700 may be implemented using, or performed by, the system 100, one or more components of the system 100, or a processor associated with the system 100 or the one or more components of the system 100. Additional, fewer, or different operations may be performed in the method 700 depending on the embodiment. In some embodiments, one or more operations of the method 700 are combined with one or more operations of at least one of the methods 500-600.

A processor (e.g., the filtering service 430, the pub-sub system 360, or a combination thereof), on a server, receives, from a cluster, a configuration state (e.g., a current configuration state) of the cluster, such as an HCI cluster 130, on an edge network (at operation 710). The processor maps the configuration state to a list of streams (at operation 720). For example, the configuration state may include multiple configuration (e.g., filtering) parameters, and every parameter maps to a stream. Parameters can include number of nodes, hypervisor type, hypervisor version, cluster management service version, cluster health check service version, or other software or hardware parameters of the cluster configuration, some of which are described above. In some embodiments, the mapping is in a data structure stored in memory or storage (e.g., non-transitory storage medium).

The processor sends the list of streams to the cluster (at operation 730). The processor receives an indication that the cluster subscribed to the list of streams (at operation 740). The processor determines whether a configuration update for one of the list of streams is available (e.g., released, identified, etc.) (at operation 750). If the processor determines that the configuration update is not available, the method 700 returns to operation 750. If the processor determines that the configuration update is available, the processor sends the configuration update to the cluster (e.g., the processor publishes/sends the configuration update on/via the one of the list of streams) (at operation 760). The processor determines whether the configuration state changes (at operation 770). In some embodiments, the configuration state change includes adding a node, upgrading a software, health status change (e.g., detecting a failure of a disk), or a status for canary deployment (e.g., a cluster is selected for receiving and applying a configuration update to see if the update is effective in resolving an issue).

If the configuration state changes, the method 700 returns to operation 720. If it does not, the method returns to operation 750 (e.g., continuously/periodically every predetermined interval check if the configuration state has changed). In some embodiments, the cluster (e.g., one or more nodes on the cluster) applies the configuration update. In some embodiments, the processor performs a remediation action in response to the configuration update (e.g., send another configuration update, send a new version of software to the cluster on the edge as part of an upgrade, order a new disk to replace the failing disk, open a new service ticket, etc.)

As described above, the server provides a list of streams (as opposed to one stream) for subscription based on a configuration state (e.g., configuration settings) of a cluster. Advantageously, processing is offloaded from the server because the server does not have to evaluate which clusters or nodes are to receive an update each time the update becomes available. Thus, the method 700 enables a scalable edge network. Moreover, the subscription is dynamic and can change whenever the cluster has a configuration state change.

Various embodiments disclosed herein are related to a non-transitory computer readable storage medium. In some embodiments, the medium includes instructions stored thereon that, when executed by a processor, cause the processor to receive, on a cloud server coupled to a cluster on an edge network, a configuration state of the cluster, map the configuration state to a list of streams, send, to the cluster, the list of streams, and receive an indication that the cluster subscribed to the list of streams.

In some embodiments, the medium further includes instructions stored thereon that, when executed by the processor, cause the processor to determine whether a configuration update is available for a stream of the list of streams and, in response to determining that the configuration update is available for the stream, send, on the stream, the configuration update to the cluster. In some embodiments, the medium further includes instructions stored thereon that, when executed by the processor, cause the processor to determine whether the configuration state changes and, in response to determining that the configuration state changes, map the changed configuration state to a second list of streams.

In some embodiments, the medium further includes instructions stored thereon that, when executed by the processor, cause the processor to detect that an edge processing unit of the cluster has generated a false positive and send, on a stream of the list of streams, a configuration update to the cluster to prevent the edge processing unit from generating the false positive. In some embodiments, the configuration state comprises one or more configuration parameters. In some embodiments, each of the one or more configuration parameters maps to a corresponding stream.

In some embodiments, the medium further includes instructions stored thereon that, when executed by the processor, cause the processor to maintain a list of configuration updates that the cluster has received on a stream of the list of streams. In some embodiments, the medium further includes instructions stored thereon that, when executed by the processor, cause the processor to receive a second indication that the cluster applies a configuration update and, in response to receiving the second indication that the cluster applies the configuration update, perform a remediation action including one or more of sending another configuration update, sending a new version of software to the cluster as part of an upgrade, ordering a new disk to replace a failing disk, or opening a new service ticket.

Various embodiments disclosed herein are related to an apparatus. the apparatus includes a processor and a memory. In some embodiments, the memory includes programmed instructions that, when executed by the processor, cause the apparatus to receive, on a cloud server coupled to a cluster on an edge network, a configuration state of the cluster, map the configuration state to a list of streams, In some embodiments, send, to the cluster, the list of streams, and receive an indication that the cluster subscribed to the list of streams.

In some embodiments, the memory further includes programmed instructions that, when executed by the processor, cause the apparatus to determine whether a configuration update is available for a stream of the list of streams and, in response to determining that the configuration update is available for the stream, send, on the stream, the configuration update to the cluster. In some embodiments, the memory further includes programmed instructions that, when executed by the processor, cause the apparatus to determine whether the configuration state changes and, in response to determining that the configuration state changes, map the changed configuration state to a second list of streams.

In some embodiments, the memory further includes programmed instructions that, when executed by the processor, cause the apparatus to detect that an edge processing unit of the cluster has generated a false positive and send, on a stream of the list of streams, a configuration update to the cluster to prevent the edge processing unit from generating the false positive. In some embodiments, the configuration state comprises one or more configuration parameters. In some embodiments, each of the one or more configuration parameters maps to a corresponding stream.

In some embodiments, the memory further includes programmed instructions that, when executed by the processor, cause the apparatus to maintain a list of configuration updates that the cluster has received on a stream of the list of streams. In some embodiments, the memory further includes programmed instructions that, when executed by the processor, cause the apparatus to receive a second indication that the cluster applies a configuration update and, in response to receiving the second indication that the cluster applies the configuration update, perform a remediation action including one or more of sending another configuration update, sending a new version of software to the cluster as part of an upgrade, ordering a new disk to replace a failing disk, or opening a new service ticket.

Various embodiments disclosed herein are related to a computer-implemented method. In some embodiments, the method includes receiving, by a processor on a cloud server coupled to a cluster on an edge network, a configuration state of the cluster, mapping the configuration state to a list of streams, sending, to the cluster, the list of streams, and receiving an indication that the cluster subscribed to the list of streams.

In some embodiments, the method further includes determining whether a configuration update is available for a stream of the list of streams and, in response to determining that the configuration update is available for the stream, sending, on the stream, the configuration update to the cluster. In some embodiments, the method further includes determining whether the configuration state changes and, in response to determining that the configuration state changes, mapping the changed configuration state to a second list of streams.

In some embodiments, the method further includes detecting that an edge processing unit of the cluster has generated a false positive and, sending, on a stream of the list of streams, a configuration update to the cluster to prevent the edge processing unit from generating the false positive. In some embodiments, the configuration state comprises one or more configuration parameters. In some embodiments, each of the one or more configuration parameters maps to a corresponding stream.

In some embodiments, the method further includes receiving a second indication that the cluster applies a configuration update and, in response to receiving the second indication that the cluster applies the configuration update, performing a remediation action including one or more of sending another configuration update, sending a new version of software to the cluster as part of an upgrade, ordering a new disk to replace a failing disk, or opening a new service ticket.

Figure 7B:
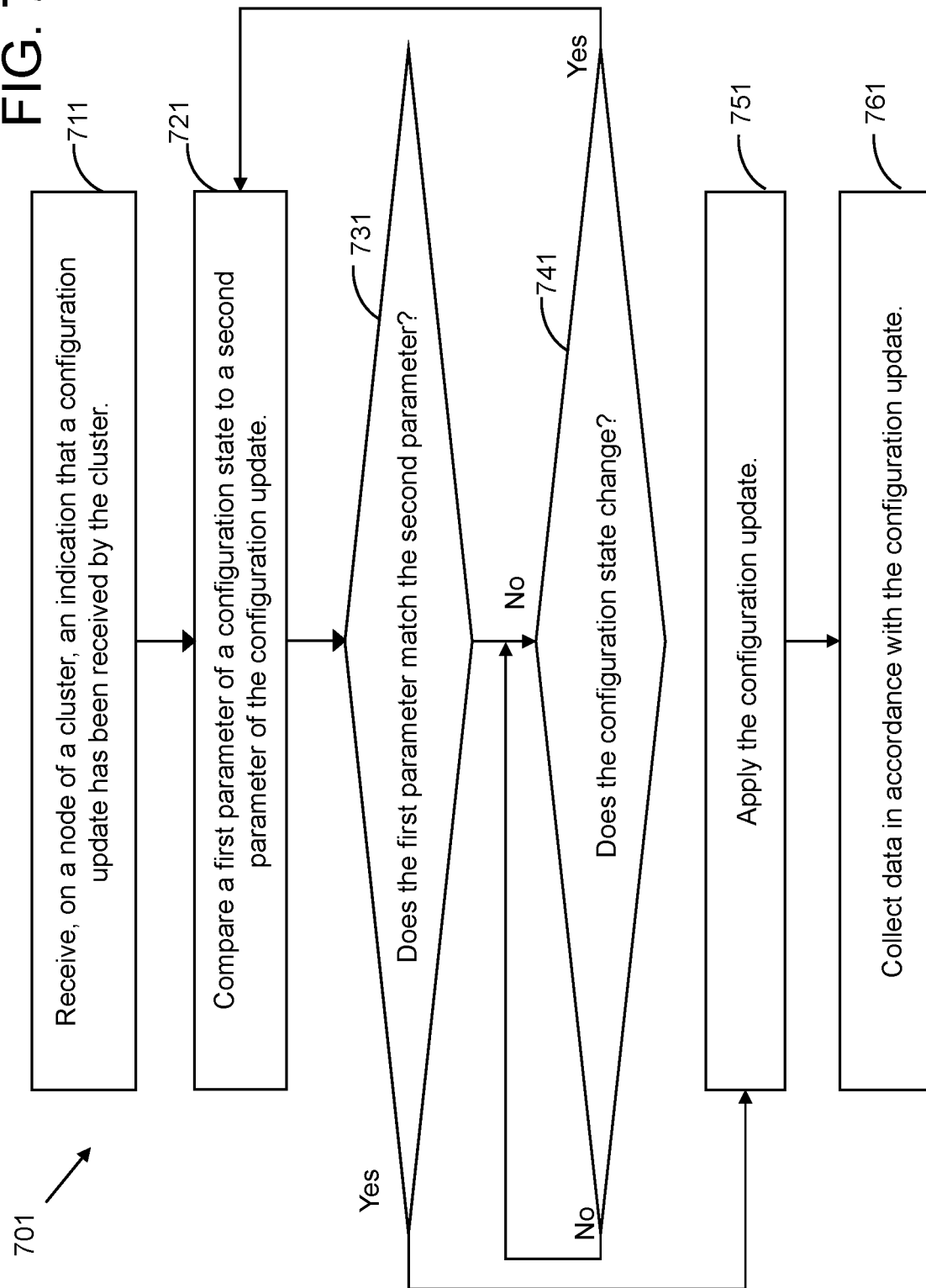
FIG. 7B is an example flowchart of a method, in accordance with some embodiments of the present disclosure.

Referring now to FIG. 7B, a flowchart of an example method 701 is illustrated, in accordance with some embodiments of the present disclosure. The method 701 may be implemented using, or performed by, the system 100, one or more components of the system 100, or a processor associated with the system 100 or the one or more components of the system 100. Additional, fewer, or different operations may be performed in the method 701 depending on the embodiment. In some embodiments, one or more operations of the method 701 are combined with one or more operations of at least one of the methods 500-700.

A processor (e.g., the filtering service 270) receives, on a node of a cluster, an indication that a configuration update has been received by the cluster (at operation 711). In some embodiments, the configuration update is received by a cluster configuration client, such as the CFS 150. The processor compares a first parameter (e.g., a type and value thereof) of a configuration state to a second parameter (e.g., a type and value thereof) of the configuration update (at operation 721). In some embodiments, (e.g., a type of) at least one of the first parameter or the second parameter includes number of nodes, hypervisor type, hypervisor version, cluster management service version, cluster health check service version, or other software or hardware parameters of the cluster configuration. The processor determines if the first parameter (e.g., value of the first parameter) matches the second parameter (e.g., value of the second parameter) (at operation 731). For example, the processor determines that the configuration state includes a hypervisor of a first type, whereas the processor the configuration update is for a hypervisor of a second type. In one aspect, for a type of a parameter includes a hypervisor type, a corresponding value of the parameter may include type-1 hypervisor, type-2 hypervisor, Nutanix Acropolis Hypevisor (AHV), Elastic Sky X (ESX), or the like.

If the processor determines that the first parameter does not match the second parameter, the processor determines whether the configuration state changes (at operation 741). In some embodiments, the processor determines whether the configuration state changes irrespective of whether the first parameter matches the second parameter. If the processor determines that the configuration state changes, the method 701 returns to the operation 721. If the processor determines that the configuration state changes, the method 701 returns to the operation 731. If the processor determines that the first parameter matches the second parameter, the processor applies the configuration update (at operation 751). The processor collects data in accordance with the configuration update (at operation 761). In some embodiments, the processor performs a remediation action in response to the configuration update (e.g., download or install an update to a software/firmware, order a new disk to replace the failing disk, request a new service ticket to be opened, etc.).

Various embodiments disclosed herein are related to a non-transitory computer readable storage medium. In some embodiments, the medium includes instructions stored thereon that, when executed by a processor, cause the processor to receive, at a node of a cluster on an edge network, an indication that the cluster received a configuration update, compare a first parameter of a configuration state of the node to a second parameter of the configuration update, determine if the first parameter matches the second parameter, in response to determining that the first parameter matches the second parameter, apply the configuration update, and collect data in accordance with the configuration update.

In some embodiments, the medium further includes instructions stored thereon that, when executed by a processor, cause the processor to determine whether the configuration state has changed and, responsive to determining that the configuration state has changed, compare a third parameter of the changed configuration state to the second parameter of the configuration update. In some embodiments, the medium further includes instructions stored thereon that, when executed by a processor, cause the processor to detect that the node has generated a false positive and send a second indication, to a cloud server coupled to the edge network, that the node has generated the false positive.

In some embodiments, the medium further includes instructions stored thereon that, when executed by a processor, cause the processor to send, to a cloud server coupled to the edge network, a list of configuration updates that the node has received. In some embodiments, the first parameter comprises one of a hypervisor type, a hypervisor version, a cluster management service version, or a cluster health check service version. In some embodiments, the configuration update is an incremental configuration update.

In some embodiments, the medium further includes instructions stored thereon that, when executed by a processor, cause the processor to, in response to applying the configuration update, perform a remediation action including one or more of downloading or installing an update to a software or firmware, ordering a new disk to replace a failing disk, or requesting a new service ticket to be opened.

Various embodiments disclosed herein are related to an apparatus. In some embodiments, the apparatus includes a processor and a memory. In some embodiments, the memory includes programmed instructions that, when executed by the processor, cause the apparatus to receive, at a node of a cluster on an edge network, an indication that the cluster received a configuration update, compare a first parameter of a configuration state of the node to a second parameter of the configuration update, determine if the first parameter matches the second parameter, in response to determining that the first parameter matches the second parameter, apply the configuration update, and collect data in accordance with the configuration update.

In some embodiments, the memory further includes programmed instructions that, when executed by the processor, cause the apparatus to determine whether the configuration state has changed and, responsive to determining that the configuration state has changed, compare a third parameter of the changed configuration state to the second parameter of the configuration update. In some embodiments, the memory further includes programmed instructions that, when executed by the processor, cause the apparatus to detect that the node has generated a false positive and send a second indication, to a cloud server coupled to the edge network, that the node has generated the false positive.

In some embodiments, the memory further includes programmed instructions that, when executed by the processor, cause the apparatus to send, to a cloud server coupled to the edge network, a list of configuration updates that the node has received. In some embodiments, the first parameter comprises one of a hypervisor type, a hypervisor version, a cluster management service version, or a cluster health check service version. In some embodiments, the configuration update is an incremental configuration update.

In some embodiments, the memory further includes programmed instructions that, when executed by the processor, cause the apparatus to, in response to applying the configuration update, perform a remediation action including one or more of downloading or installing an update to a software or firmware, ordering a new disk to replace a failing disk, or requesting a new service ticket to be opened.

Various embodiments disclosed herein are related to a computer-implemented method. In some embodiments, the method includes receiving, by a processor at a node of a cluster on an edge network, an indication that the cluster received a configuration update, comparing a first parameter of a configuration state of the node to a second parameter of the configuration update, determining if the first parameter matches the second parameter, in response to determining that the first parameter matches the second parameter, applying the configuration update, and collecting data in accordance with the configuration update.

In some embodiments, the method further includes determining whether the configuration state has changed and, responsive to determining that the configuration state has changed, comparing a third parameter of the changed configuration state to the second parameter of the configuration update. In some embodiments, the method further includes detecting that the node has generated a false positive and sending a second indication, to a cloud server coupled to the edge network, that the node has generated the false positive.

In some embodiments, the method further includes sending, to a cloud server coupled to the edge network, a list of configuration updates that the node has received. In some embodiments, the first parameter comprises one of a hypervisor type, a hypervisor version, a cluster management service version, or a cluster health check service version.

In some embodiments, the method further includes, in response to applying the configuration update, performing a remediation action including one or more of downloading or installing an update to a software or firmware, ordering a new disk to replace a failing disk, or requesting a new service ticket to be opened.

Figure 8A:
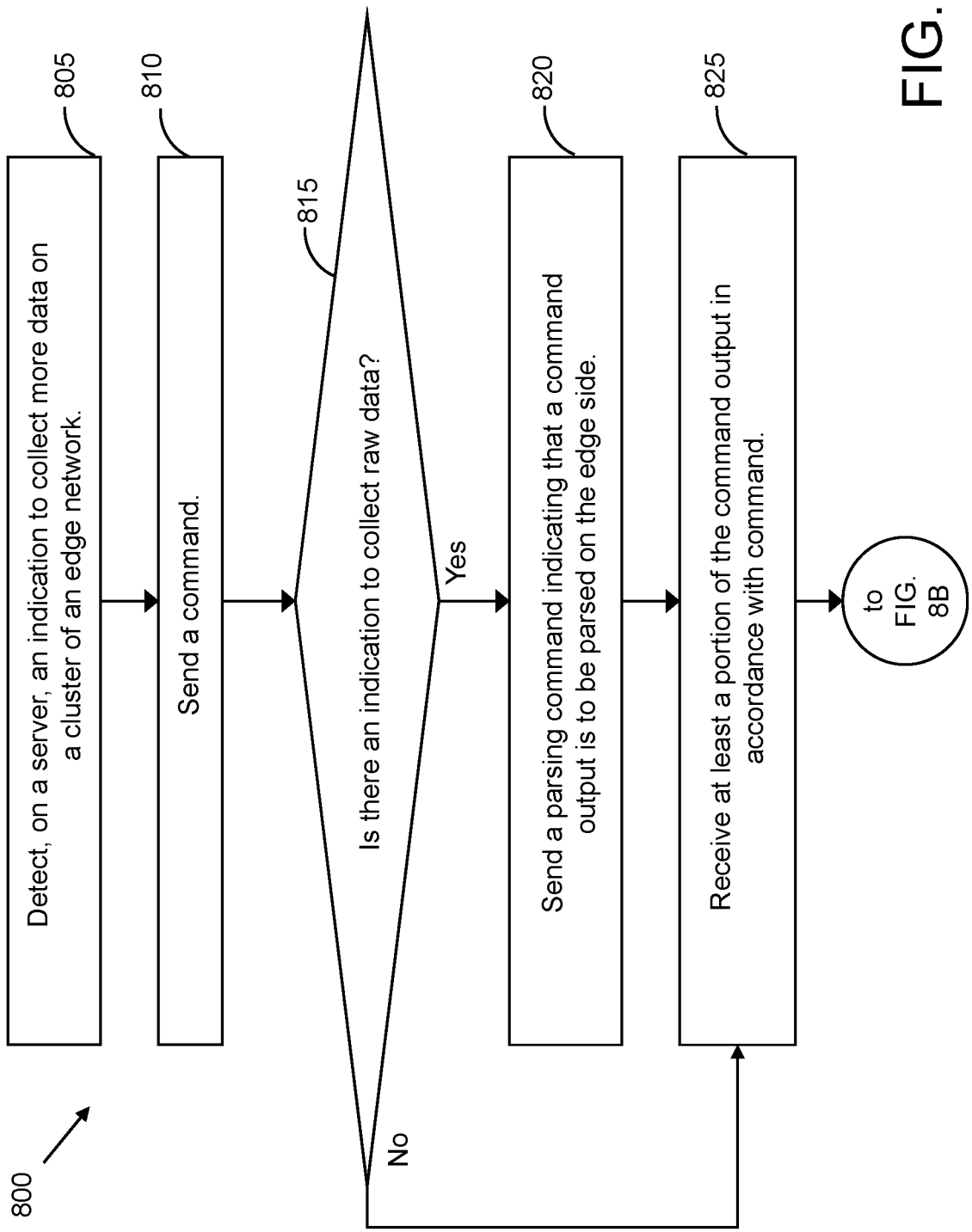

Referring now to FIGS. 8A-8B, a flowchart of an example method 800 is illustrated, in accordance with some embodiments of the present disclosure. The method 800 may be implemented using, or performed by, the system 100, one or more components of the system 100, or a processor associated with the system 100 or the one or more components of the system 100. Additional, fewer, or different operations may be performed in the method 800 depending on the embodiment. In some embodiments, one or more operations of the method 800 are combined with one or more operations of at least one of the methods 500-701.

A processor (e.g., the discovery service 160, the user interface 170, the RCC 440, or a combination thereof) detects an indication to collect additional data on a cluster of an edge network (at operation 805). In some embodiments, the processor detects an indication to collect additional data based on determining that a cluster has an issue (e.g., detection of the issue is the indication that additional data is needed). In some embodiments, the indication specifies that the additional data is to be sent to the server for further processing. The processor sends, to the cluster, a command to receive a command output including the collected additional data (at operation 810).

The processor determines whether there is an indication to collect raw data or parsed data (at operation 815). The processor may determine the type of data needed (e.g., raw data or parsed data) based on the indication to collect additional data. For example, if the processor determines that a name of a VM is needed, raw data can be sent, whereas if the processor determines that a report of which nodes powered on in the last 7 days is needed, parsed data should be sent to reduce network I/O and processing on the server side.

The processor indicates to the cluster to send the type of data. If the processor determines that there is an indication to collect raw data, the processor sends, to the cluster, a parsing command indicating that a command output is to be parsed on the edge side (at operation 820). In some embodiments, not sending a parsing command within a predetermined time period of sending the command indicates to the cluster to send the command output as raw data. The processor receives at least a portion of the command output in accordance with the command (at operation 825).

The processor determines whether the command output is chunked (e.g., chunkified, split, partitioned, separated into data units, etc.) (at operation 830). In some embodiments, the cluster (e.g., a node on the cluster) decides whether to chunk the command output. In some embodiments, if the command output exceeds the limit, the cluster sends the command output as one or more chunked file uploads, but if the command output is less than the limit, the cluster sends the command output as one packet (e.g., HTTP request packet). If the processor determines that the command output is chunked, the processor determines whether all of the chunks constituting the command output have been collected (at operation 835). If the processor determines that all of the chunks are not collected, the processor receives a second chunk (at operation 840) and the method 800 returns to operation 835. This loop repeats until all of the chunks are collected. If the processor determines that all of the chunks are collected, the processor aggregates the chunks (at operation 845). The processor troubleshoots an issue of the cluster based on the command output (at operation 850). In some embodiments, responsive to troubleshooting the issue, the processor performs a remediation action (e.g., send another configuration update, send a new version of software to the cluster on the edge as part of an upgrade, order a new disk to replace the failing disk, open a new service ticket, etc.).

Various embodiments disclosed herein are related to a non-transitory computer readable storage medium. In some embodiments, the medium includes instructions stored thereon that, when executed by a processor, cause the processor to detect, on a cloud server, an indication to collect additional data from a cluster on an edge network coupled to the cloud server, send, to the cluster, a command to receive a command output, indicate, to the cluster, to send the command output as a type of data including at least one of raw data or parsed data, receive the command output in accordance with the command and the type of command output, and troubleshoot an issue of the cluster based on the command output.

In some embodiments, the medium further includes instructions stored thereon that, when executed by a processor, cause the processor to determine that the command output includes a report and indicate, to the cluster, to send the command output as the parsed data. In some embodiments, the medium further includes instructions stored thereon that, when executed by a processor, cause the processor to determine whether the command output is chunked into a plurality of chunks.

In some embodiments, the medium further includes instructions stored thereon that, when executed by a processor, cause the processor to determine that the command output is chunked into the plurality of chunks and determine whether the plurality of chunks are collected by the cloud server. In some embodiments, the medium further includes instructions stored thereon that, when executed by a processor, cause the processor to determine that the plurality of chunks are collected by the cloud server and aggregate the plurality of chunks.

In some embodiments, the medium further includes instructions stored thereon that, when executed by a processor, cause the processor to detect the indication to collect the additional data based on determining that the cluster has the issue. In some embodiments, the medium further includes instructions stored thereon that, when executed by a processor, cause the processor to, in response to troubleshooting the issue, perform a remediation action including one or more of sending another configuration update, sending a new version of software to the cluster as part of an upgrade, ordering a new disk to replace a failing disk, or opening a new service ticket.

Various embodiments disclosed herein are related to an apparatus. In some embodiments, the apparatus includes a processor and a memory. In some embodiments, the memory includes programmed instructions that, when executed by the processor, cause the apparatus to detect, on a cloud server, an indication to collect additional data from a cluster on an edge network coupled to the cloud server, send, to the cluster, a command to receive a command output, indicate, to the cluster, to send the command output as a type of data including at least one of raw data or parsed data, receive the command output in accordance with the command and the type of command output, and troubleshoot an issue of the cluster based on the command output.

In some embodiments, the memory further includes programmed instructions that, when executed by the processor, cause the apparatus to determine that the command output includes a report and indicate, to the cluster, to send the command output as the parsed data. In some embodiments, the memory further includes programmed instructions that, when executed by the processor, cause the apparatus to determine whether the command output is chunked into a plurality of chunks.

In some embodiments, the memory further includes programmed instructions that, when executed by the processor, cause the apparatus to determine that the command output is chunked into the plurality of chunks and determine whether the plurality of chunks are collected by the cloud server. In some embodiments, the memory further includes programmed instructions that, when executed by the processor, cause the apparatus to determine that the plurality of chunks are collected by the cloud server and aggregate the plurality of chunks.

In some embodiments, the memory further includes programmed instructions that, when executed by the processor, cause the apparatus to detect the indication to collect the additional data based on determining that the cluster has the issue. In some embodiments, the memory further includes programmed instructions that, when executed by the processor, cause the apparatus to, in response to troubleshooting the issue, perform a remediation action including one or more of sending another configuration update, sending a new version of software to the cluster as part of an upgrade, ordering a new disk to replace a failing disk, or opening a new service ticket.

Various embodiments disclosed herein are related to a computer-implemented method. In some embodiments, the method includes detecting, by a processor on a cloud server, an indication to collect additional data from a cluster on an edge network coupled to the cloud server, sending, to the cluster, a command to receive a command output, indicating, to the cluster, to send the command output as a type of data including at least one of raw data or parsed data, receiving the command output in accordance with the command and the type of command output, and troubleshooting an issue of the cluster based on the command output.

In some embodiments, the method further includes determining that the command output includes a report and indicating, to the cluster, to send the command output as the parsed data. In some embodiments, the method further includes determining whether the command output is chunked into a plurality of chunks.

In some embodiments, the method further includes determining that the command output is chunked into the plurality of chunks and determining whether the plurality of chunks are collected by the cloud server. In some embodiments, the method further includes determining that the plurality of chunks are collected by the cloud server and aggregating the plurality of chunks.

In some embodiments, the method further includes, in response to troubleshooting the issue, performing a remediation action including one or more of sending another configuration update, sending a new version of software to the cluster as part of an upgrade, ordering a new disk to replace a failing disk, or opening a new service ticket.

Figure 9B:
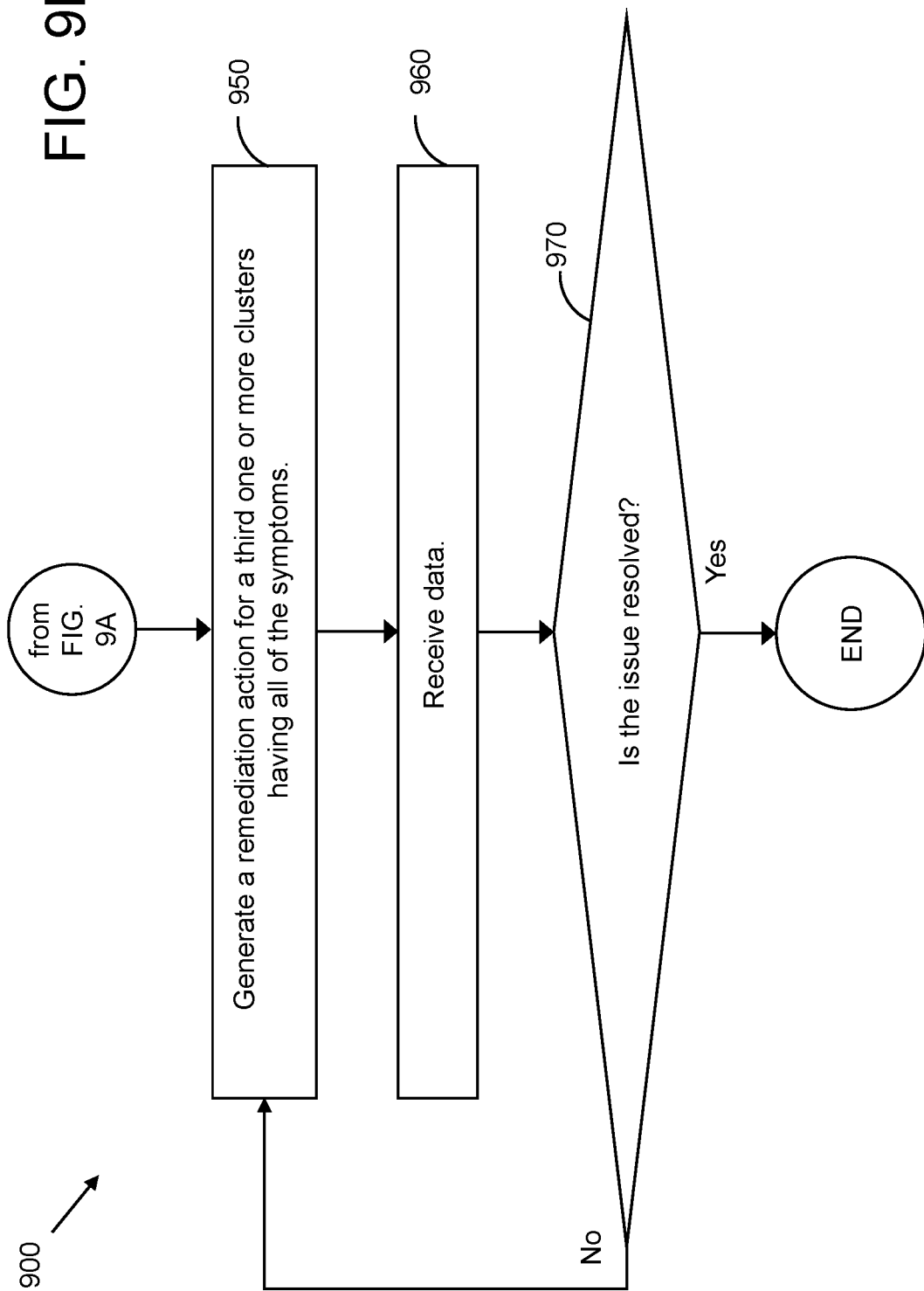

Referring now to FIGS. 9A-9B, a flowchart of an example method 900 is illustrated, in accordance with some embodiments of the present disclosure. The method 900 may be implemented using, or performed by, the system 100, one or more components of the system 100, or a processor associated with the system 100 or the one or more components of the system 100. Additional, fewer, or different operations may be performed in the method 900 depending on the embodiment. In some embodiments, one or more operations of the method 900 are combined with one or more operations of at least one of the methods 500-800.

A processor (e.g., a discovery service such as the discovery service 160, a cloud control plane such as the cloud control plane 180, or a combination thereof) detects, on a server, a first symptom observable on a first one or more clusters of an edge network (e.g., HCI clusters 130 or nodes therein) (at operation 910). The first symptom is indicative of an issue. For example, the processor detects that a customer is not able to write data, such that the first one or more clusters are all the clusters owned by that customer. The processor may determine this information based on data that is regularly (e.g., previously) collected and/or processed at the edge network. The processor triggers additional data collection for the one or more first clusters (at operation 920). For example, the processor triggers collection of one or more of I/O (input/output) stack of the disk, hardware information of the disk (version, firmware), a lifespan of disk, hardware and software diagnostics, or other information about each of the clusters.

From the first one or more clusters, the processor determines, based on the additional data collected, a second one or more clusters (e.g., that is a part of the first one or more clusters) that have a second symptom indicative of the issue (at operation 930). The second symptom may be latency exceeding a threshold, a version of a software, or a type of hypervisor. The processor determines whether there are any more (e.g., related) symptoms indicative of the issue (at operation 940). If there are more symptoms, the method 900 returns to the operation 920 for the next symptom(s) and repeats until a third one or more clusters that have each of the symptoms indicative of the issue are determined. The second one or more clusters include the third one or more clusters. The processor generates a remediation action for the third one or more clusters (at operation 950). In some embodiments, the remediation action includes one or more of sending a new disk to the customers associated with the subset of clusters, running/sending a configuration update, manually intervening to correct the issue, or creating a service ticket.

The processor receives data (either as part of regular data collection or as a part of the additional data collection) from the third one or more clusters (at operation 960). The processor determines, based on the received data, whether the issue is resolved (at operation 970). If the issue is not resolved, the method 900 returns to the operation 950 to generate another remediation action and repeats until the issue is resolved. In some embodiments, if the issue is not resolved, the method 900 returns to operation 920.

Various embodiments disclosed herein are related to a non-transitory computer readable storage medium. In some embodiments, the medium includes instructions stored thereon that, when executed by a processor, cause the processor to detect, on a server, a first symptom observable on a first one or more clusters. In some embodiments, the first symptom is indicative of an issue. In some embodiments, the medium includes instructions stored thereon that, when executed by a processor, cause the processor to trigger additional data collection by a plurality of edge processing units for the first one or more of clusters, detect, in a second one or more clusters within the first one or more clusters, a second symptom indicative of the issue, and generate a remediation action for a third one or more clusters having the first symptom and the second symptom. In some embodiments, the second one or more clusters include the third one or more clusters.

In some embodiments, the medium includes further instructions stored thereon that, when executed by a processor, cause the processor to detect the first symptom based on previously collected data. In some embodiments, the additional data collection includes one or more of an input/output (I/O) stack of a disk, a version of the disk, a firmware of the disk, a lifespan of the disk, hardware diagnostics, or software diagnostics.

In some embodiments, the medium further includes instructions stored thereon that, when executed by a processor, cause the processor to determine whether there is a third symptom indicative of the issue. In some embodiments, the medium further includes instructions stored thereon that, when executed by a processor, cause the processor to trigger a second additional data collection by the plurality of edge processing units for the second one or more of clusters.

In some embodiments, the medium further includes instructions stored thereon that, when executed by a processor, cause the processor to determine whether the issue is resolved in the third one or more clusters and, in response to determining that the issue is not resolved in the third one or more clusters, generate a second remediation action for the third one or more clusters. In some embodiments, the remediation action comprises one or more of sending a new disk to customers associated with the third one or more clusters, running a configuration update, manually intervening to correct the issue, or creating a service ticket.

Various embodiments disclosed herein are related to an apparatus. In some embodiments, the apparatus includes a processor and a memory. In some embodiments, the memory includes programmed instructions that, when executed by the processor, cause the apparatus to detect, on a server, a first symptom observable on a first one or more clusters. In some embodiments, the first symptom is indicative of an issue. In some embodiments, the memory includes programmed instructions that, when executed by the processor, cause the apparatus to trigger additional data collection by a plurality of edge processing units for the first one or more of clusters, detect, in a second one or more clusters within the first one or more clusters, a second symptom indicative of the issue, and generate a remediation action for a third one or more clusters having the first symptom and the second symptom. In some embodiments, the second one or more clusters include the third one or more clusters.

In some embodiments, the memory further includes programmed instructions that, when executed by the processor, cause the apparatus to detect the first symptom based on previously collected data. In some embodiments, the additional data collection includes one or more of an input/output (I/O) stack of a disk, a version of the disk, a firmware of the disk, a lifespan of the disk, hardware diagnostics, or software diagnostics.

In some embodiments, the memory further includes programmed instructions that, when executed by the processor, cause the apparatus to determine whether there is a third symptom indicative of the issue. In some embodiments, the memory further includes programmed instructions that, when executed by the processor, cause the apparatus to trigger a second additional data collection by the plurality of edge processing units for the second one or more of clusters.

In some embodiments, the memory further includes programmed instructions that, when executed by the processor, cause the apparatus to determine whether the issue is resolved in the third one or more clusters and, in response to determining that the issue is not resolved in the third one or more clusters, generate a second remediation action for the third one or more clusters. In some embodiments, the remediation action comprises one or more of sending a new disk to customers associated with the third one or more clusters, running a configuration update, manually intervening to correct the issue, or creating a service ticket.

Various embodiments disclosed herein are related to a computer-implemented method. In some embodiments, the method includes detecting, on a server, a first symptom observable on a first one or more clusters. In some embodiments, the first symptom is indicative of an issue. In some embodiments, the method includes triggering additional data collection by a plurality of edge processing units for the first one or more of clusters, detecting, in a second one or more clusters within the first one or more clusters, a second symptom indicative of the issue, and generating a remediation action for a third one or more clusters having the first symptom and the second symptom. In some embodiments, the second one or more clusters include the third one or more clusters.

In some embodiments, the method further includes detecting the first symptom based on previously collected data. In some embodiments, the additional data collection includes one or more of an input/output (I/O) stack of a disk, a version of the disk, a firmware of the disk, a lifespan of the disk, hardware diagnostics, or software diagnostics.

In some embodiments, the method further includes determining whether there is a third symptom indicative of the issue and triggering a second additional data collection by the plurality of edge processing units for the second one or more of clusters. In some embodiments, the method further includes determining whether the issue is resolved in the third one or more clusters and, in response to determining that the issue is not resolved in the third one or more clusters, generating a second remediation action for the third one or more clusters.

In some embodiments, the remediation action comprises one or more of sending a new disk to customers associated with the third one or more clusters, running a configuration update, manually intervening to correct the issue, or creating a service ticket.

Referring now to FIG. 10, a flowchart of an example method 1000 is illustrated, in accordance with some embodiments of the present disclosure. The method 1000 may be implemented using, or performed by, the system 100, one or more components of the system 100, or a processor associated with the system 100 or the one or more components of the system 100. Additional, fewer, or different operations may be performed in the method 1000 depending on the embodiment. In some embodiments, one or more operations of the method 1000 are combined with one or more operations of at least one of the methods 500-900.

A processor (e.g., the classification service 340, the recommendation service 350, or a combination thereof) classifies clusters/nodes based on one or more classification parameters (e.g., feature vectors) (at operation 1010). The processor detects, within the plurality of clusters, one or more affected clusters having an issue (at operation 1020). The processor determines classification parameter values of the affected clusters (e.g. at least one of affected clusters or affected nodes) (at operation 1030). For example, the issue may be a bad disk. Classification parameters may include one or more of the I/O per second (IOPS), the number of nodes in the cluster, the version/type of firmware of the disk, or the model of the disk. The classification parameters may indicate one or more of that the affected clusters/nodes are on I/O intensive clusters, on bigger clusters, with a specific firmware, or a specific model of disk.

The processor determines other clusters that have the classification parameter values or other values that are within a predetermined amount/percentage of the classification parameter values (at operation 1040). For example, the IOPS or number of nodes fall in the range of the affected clusters/nodes and the firmware and model of disk are the same. The processor generates a remediation action or an instruction to perform a remediation action (e.g., recommendation) (at operation 1050). The processor sends an instruction for a remediation action to the other clusters (e.g., instructs the other clusters to download or install an update to a software/firmware, order a new disk to replace the failing disk, request a new service ticket to be opened, etc.) or performs the remediation action on behalf of the one or more other clusters (e.g., send another configuration update, send a new version of software to the cluster on the edge as part of an upgrade, order a new disk to replace the failing disk, open a new service ticket, etc.) (at operation 1060). In some embodiments, the processor sends the remediation action to the affected clusters and the other clusters or performs the remediation action on behalf of the affected clusters and the other clusters. If the other clusters receive the instruction, the other clusters can perform a remediation action based on the instruction.

Advantageously, the method 1000 can detect, predict, and/or correct issues on other clusters that are heuristically related to affected clusters on which issues have already been detected, even if the affected clusters and the other clusters are not physical related. For example, in some embodiments, the affected clusters and other clusters are in separate datacenters and/or geographies. In one aspect, the affected clusters can be in a first datacenter in a first geographic region/zone (e.g., Western United States, United States, etc.) and the other clusters can be in a second datacenter in a second geographic region/zone (e.g., Eastern United States, India, Etc.) In some embodiments, the affected clusters and other clusters are not connected to a same hypervisor, and not connected to a same switch.

In some embodiments, the classification service classifies a parameter such as a version of a cluster management software. The recommendation service identifies clusters that are using an unacceptably old (older than a predetermined threshold) or a faulty version (e.g., a version that has IOPS below a predetermined threshold). The recommendation service can send a recommendation to those who are running the old or faulty version. In some embodiments, the recommendation is dependent on context. For example, the customer of the cluster may require the older version of the service or may have a policy that caps the IOPS of the service.

Various embodiments disclosed herein are related to a non-transitory computer readable storage medium. In some embodiments, the medium includes instructions stored thereon that, when executed by a processor, cause the processor to classify, on a cloud server, a plurality of clusters of an edge network based on one or more classification parameters. In some embodiments, the plurality of clusters includes a first cluster and a second cluster. In some embodiments, the medium includes instructions stored thereon that, when executed by a processor, cause the processor to detect that the first cluster in a first datacenter of the edge network has an issue, determine a classification parameter value of the first cluster, and determine that the second cluster in a second datacenter of the edge network has a second classification parameter value within a predetermined amount of the classification parameter value. In some embodiments, the second datacenter is different than the first datacenter. In some embodiments, the medium includes instructions stored thereon that, when executed by a processor, cause the processor to send an instruction to the second cluster to perform a remediation action.

In some embodiments, the one or more classification parameters include one or more of one or more of an input/output (I/O) per second (IOPS), a number of nodes, a version of firmware of a disk, a type of firmware of the disk, or a model of the disk. In some embodiments, the issue is that the first cluster is using a failing disk.

In some embodiments, the remediation action includes downloading or installing an update to a software or a firmware, ordering a new disk to replace a failing disk, or requesting a new service ticket to be opened. In some embodiments, the medium further includes instructions stored thereon that, when executed by a processor, cause the processor to perform a second remediation action on behalf of the second cluster.

In some embodiments, the issue is that the second cluster is using a version of software that is older than a predetermined version of the software. In some embodiments, the first datacenter is in a first geographic region and wherein the second datacenter is in a second geographic region different than the first geographic region.

Various embodiments disclosed herein are related to an apparatus. In some embodiments, the apparatus includes a processor and a memory. In some embodiments, the memory includes programmed instructions that, when executed by the processor, cause the apparatus to classify, on a cloud server, a plurality of clusters of an edge network based on one or more classification parameters. In some embodiments, the plurality of clusters includes a first cluster and a second cluster. In some embodiments, the memory includes programmed instructions that, when executed by the processor, cause the apparatus to detect that the first cluster in a first datacenter of the edge network has an issue, determine a classification parameter value of the first cluster, and determine that the second cluster in a second datacenter of the edge network has a second classification parameter value within a predetermined amount of the classification parameter value. In some embodiments, the second datacenter is different than the first datacenter. In some embodiments, the memory includes programmed instructions that, when executed by the processor, cause the apparatus to send an instruction to the second cluster to perform a remediation action.

In some embodiments, the one or more classification parameters include one or more of one or more of an input/output (I/O) per second (IOPS), a number of nodes, a version of firmware of a disk, a type of firmware of the disk, or a model of the disk. In some embodiments, the issue is that the first cluster is using a failing disk.

In some embodiments, the remediation action includes downloading or installing an update to a software or a firmware, ordering a new disk to replace a failing disk, or requesting a new service ticket to be opened. In some embodiments, the memory further includes programmed instructions that, when executed by the processor, cause the apparatus to perform a second remediation action on behalf of the second cluster.

In some embodiments, the issue is that the second cluster is using a version of software that is older than a predetermined version of the software. In some embodiments, the first datacenter is in a first geographic region and wherein the second datacenter is in a second geographic region different than the first geographic region.

Various embodiments disclosed herein are related to a computer-implemented method. In some embodiments, the method includes classifying, on a cloud server, a plurality of clusters of an edge network based on one or more classification parameters. In some embodiments, the plurality of clusters includes a first cluster and a second cluster. In some embodiments, the method includes detecting that the first cluster in a first datacenter of the edge network has an issue, determining a classification parameter value of the first cluster, and determining that the second cluster in a second datacenter of the edge network has a second classification parameter value within a predetermined amount of the classification parameter value. In some embodiments, the second datacenter is different than the first datacenter. In some embodiments, the method includes sending an instruction to the second cluster to perform a remediation action.

In some embodiments, the one or more classification parameters include one or more of one or more of an input/output (I/O) per second (IOPS), a number of nodes, a version of firmware of a disk, a type of firmware of the disk, or a model of the disk. In some embodiments, the issue is that the first cluster is using a failing disk.

In some embodiments, the remediation action includes downloading or installing an update to a software or a firmware, ordering a new disk to replace a failing disk, or requesting a new service ticket to be opened. In some embodiments, the method further includes performing a second remediation action on behalf of the second cluster. In some embodiments, the first datacenter is in a first geographic region and wherein the second datacenter is in a second geographic region different than the first geographic region.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A non-transitory computer readable storage medium comprising instructions stored thereon that, when executed by a processor, cause the processor to:
   classify, on a cloud server, a plurality of clusters of an edge network based on one or more classification parameters, the plurality of clusters including a first cluster and a second cluster;
   detect that the first cluster in a first datacenter of the edge network has an issue;
   determine a classification parameter value of the first cluster;
   determine that the second cluster in a second datacenter of the edge network has a second classification parameter value within a predetermined amount of the classification parameter value, wherein the second datacenter is different than the first datacenter; and
   send an instruction to the second cluster to perform a remediation action, wherein the remediation action at the second cluster is a prediction that the issue is likely to occur at the second cluster.

2. The medium of claim 1, wherein the one or more classification parameters include one or more of one or more of an input/output (I/O) per second (IOPS), a number of nodes, a version of firmware of a disk, a type of firmware of the disk, or a model of the disk.

3. The medium of claim 1, wherein the issue is that the first cluster is using a failing disk.

4. The medium of claim 1, wherein the remediation action includes downloading or installing an update to a software or a firmware, ordering a new disk to replace a failing disk, or requesting a new service ticket to be opened.

5. The medium of claim 1, further comprising instructions that, when executed by the processor, cause the processor to perform a second remediation action on behalf of the second cluster.

6. The medium of claim 1, wherein the issue is that the second cluster is using a version of software that is older than a predetermined version of the software.

7. The medium of claim 1, wherein the first datacenter is in a first geographic region and wherein the second datacenter is in a second geographic region different than the first geographic region.

8. An apparatus comprising a processor and a memory, wherein the memory includes programmed instructions that, when executed by the processor, cause the apparatus to:
   classify, on a cloud server, a plurality of clusters of an edge network based on one or more classification parameters, the plurality of clusters including a first cluster and a second cluster;
   detect that the first cluster in a first datacenter of the edge network has an issue;
   determine a classification parameter value of the first cluster;
   determine that the second cluster in a second datacenter of the edge network has a second classification parameter value within a predetermined amount of the classification parameter value, wherein the second datacenter is different than the first datacenter; and
   send an instruction to the second cluster to perform a remediation action, wherein the remediation action at the second cluster is a prediction that the issue is likely to occur at the second cluster.

9. The apparatus of claim 8, wherein the one or more classification parameters include one or more of one or more of an input/output (I/O) per second (IOPS), a number of nodes, a version of firmware of a disk, a type of firmware of the disk, or a model of the disk.

10. The apparatus of claim 8, wherein the issue is that the first cluster is using a failing disk.

11. The apparatus of claim 8, wherein the remediation action includes downloading or installing an update to a software or a firmware, ordering a new disk to replace a failing disk, or requesting a new service ticket to be opened.

12. The apparatus of claim 8, wherein the memory further includes programmed instructions that, when executed by the processor, cause the apparatus to perform a second remediation action on behalf of the second cluster.

13. The apparatus of claim 8, wherein the issue is that the second cluster is using a version of software that is older than a predetermined version of the software.

14. The apparatus of claim 8, wherein the first datacenter is in a first geographic region and wherein the second datacenter is in a second geographic region different than the first geographic region.

15. A computer-implemented method comprising:
   classifying, on a cloud server, a plurality of clusters of an edge network based on one or more classification parameters, the plurality of clusters including a first cluster and a second cluster;
   detecting that the first cluster in a first datacenter of the edge network has an issue;
   determining a classification parameter value of the first cluster;
   determining that the second cluster in a second datacenter of the edge network has a second classification parameter value within a predetermined amount of the classification parameter value, wherein the second datacenter is different than the first datacenter; and
   sending an instruction to the second cluster to perform a remediation action, wherein the remediation action at the second cluster is a prediction that the issue is likely to occur at the second cluster.

16. The method of claim 15, wherein the one or more classification parameters include one or more of one or more of an input/output (I/O) per second (IOPS), a number of nodes, a version of firmware of a disk, a type of firmware of the disk, or a model of the disk.

17. The method of claim 15, wherein the issue is that the first cluster is using a failing disk.

18. The method of claim 15, wherein the remediation action includes downloading or installing an update to a software or a firmware, ordering a new disk to replace a failing disk, or requesting a new service ticket to be opened.

19. The method of claim 15, further comprising performing a second remediation action on behalf of the second cluster.

20. The method of claim 15, wherein the first datacenter is in a first geographic region and wherein the second datacenter is in a second geographic region different than the first geographic region.

21. The medium of claim 1, wherein classifying the plurality of clusters based on one or more classification parameters comprises classifying the plurality of clusters based on a configuration state.

22. The apparatus of claim 8, wherein the plurality of clusters are classified based on a configuration state.

23. The method of claim 15, wherein classifying the plurality of clusters based on one or more classification parameters comprises classifying the plurality of clusters based on a configuration state.

24. The medium of claim 1, wherein the remediation action comprises a contextual recommendation based on a current and previous state of the first cluster along with the issue.

25. The apparatus of claim 8, wherein the remediation action comprises a contextual recommendation based on a current and previous state of the first cluster along with the issue.

26. The method of claim 15, wherein the remediation action comprises a contextual recommendation based on a current and previous state of the first cluster along with the issue.

* * * * *